US010023028B2

(12) United States Patent
Bugno et al.

(10) Patent No.: US 10,023,028 B2
(45) Date of Patent: Jul. 17, 2018

(54) SWITCHABLE VARIABLE TRANSMITTANCE WINDOW ASSEMBLY

(71) Applicant: Gentex Corporation, Zeeland, MI (US)

(72) Inventors: Mark D Bugno, Stevensville, MI (US); David J Cammenga, Zeeland, MI (US); Bradley L Busscher, Grand Rapids, MI (US); David I Driscoll, Caledonia, MI (US); Kevin L Ash, Grand Rapids, MI (US); Alex K Cammenga, Hudsonville, MI (US); Andrew D Weller, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 441 days.

(21) Appl. No.: 13/724,122

(22) Filed: Dec. 21, 2012

(65) Prior Publication Data
US 2013/0161971 A1 Jun. 27, 2013

Related U.S. Application Data

(60) Provisional application No. 61/578,643, filed on Dec. 21, 2011, provisional application No. 61/623,612, filed on Apr. 13, 2012.

(51) Int. Cl.
G02F 1/03 (2006.01)
G02F 1/15 (2006.01)
G09G 3/19 (2006.01)
H04N 9/16 (2006.01)
B60J 3/04 (2006.01)
B64C 1/14 (2006.01)

(52) U.S. Cl.
CPC ............... *B60J 3/04* (2013.01); *B64C 1/1484* (2013.01); *B64C 1/1492* (2013.01)

(58) Field of Classification Search
CPC ...... G02F 1/1523; G02F 1/1533; G02F 1/155; G02F 1/0102; G02F 1/163; G09G 3/16
USPC ................ 359/245–247, 242, 265–275, 277; 345/49, 105, 107; 348/814, 817; 438/929; 349/182–186
See application file for complete search history.

(56) References Cited

U.S. PATENT DOCUMENTS

| | | |
|---|---|---|
| 5,668,663 A | 9/1997 | Varaprasad et al. |
| 5,724,187 A | 3/1998 | Varaprasad et al. |
| 5,805,330 A | 9/1998 | Byker et al. |
| 5,940,201 A | 8/1999 | Ash et al. |
| 6,045,643 A | 4/2000 | Byker et al. |
| 6,137,620 A | 10/2000 | Guarr et al. |
| 6,239,898 B1 | 5/2001 | Byker et al. |
| 6,407,847 B1 | 6/2002 | Poll et al. |

(Continued)

OTHER PUBLICATIONS

Patent Cooperation Treaty, International Searching Authority, International Search Report, Written Opinion of the International Searching Authority and Notification of Transmittal, dated Apr. 4, 2013, 9 Pages.

*Primary Examiner* — Dawayne A Pinkney
(74) *Attorney, Agent, or Firm* — Price Heneveld LLP

(57) ABSTRACT

An autodimming window assembly for a vehicle such as an aircraft includes a UI devoid of movable elements and integrated with a dust cover of the window assembly. A dust cover optionally includes a lightguide configured to deliver light from a light source associated with the assembly and indicia representing an operational characteristic of the UI and articulated to the dust cover.

20 Claims, 24 Drawing Sheets

(56) References Cited

U.S. PATENT DOCUMENTS

| | | | |
|---|---|---|---|
| 6,433,913 B1 | 8/2002 | Bauer et al. | |
| 6,433,914 B1 | 8/2002 | Lomprey et al. | |
| 6,567,708 B1 | 5/2003 | Bechtel et al. | |
| 6,597,489 B1 | 7/2003 | Guarr et al. | |
| 7,085,609 B2 | 8/2006 | Bechtel et al. | |
| 7,256,923 B2 | 8/2007 | Liu et al. | |
| 7,428,091 B2 | 9/2008 | Baumann et al. | |
| 7,502,156 B2 | 3/2009 | Tonar et al. | |
| 7,525,714 B2 | 4/2009 | Poll et al. | |
| 7,535,614 B1 | 5/2009 | Tapley et al. | |
| 7,822,490 B2 | 10/2010 | Bechtel et al. | |
| 7,855,821 B2 | 12/2010 | Baumann et al. | |
| 7,990,603 B2 | 8/2011 | Ash et al. | |
| 8,169,684 B2 | 5/2012 | Bugno et al. | |
| 2005/0150589 A1* | 7/2005 | Amos et al. | 156/209 |
| 2005/0200933 A1 | 9/2005 | Weidner | |
| 2005/0270621 A1* | 12/2005 | Bauer et al. | 359/265 |
| 2007/0285759 A1* | 12/2007 | Ash | B60J 3/04 359/275 |
| 2008/0030836 A1* | 2/2008 | Tonar | B60R 1/084 359/271 |
| 2008/0066971 A1 | 3/2008 | Whang et al. | |
| 2009/0015736 A1* | 1/2009 | Weller et al. | 349/11 |
| 2010/0085511 A1* | 4/2010 | Watanabe et al. | 349/67 |
| 2011/0255142 A1 | 10/2011 | Ash et al. | |
| 2013/0278989 A1* | 10/2013 | Lam | B60J 3/04 359/275 |

* cited by examiner

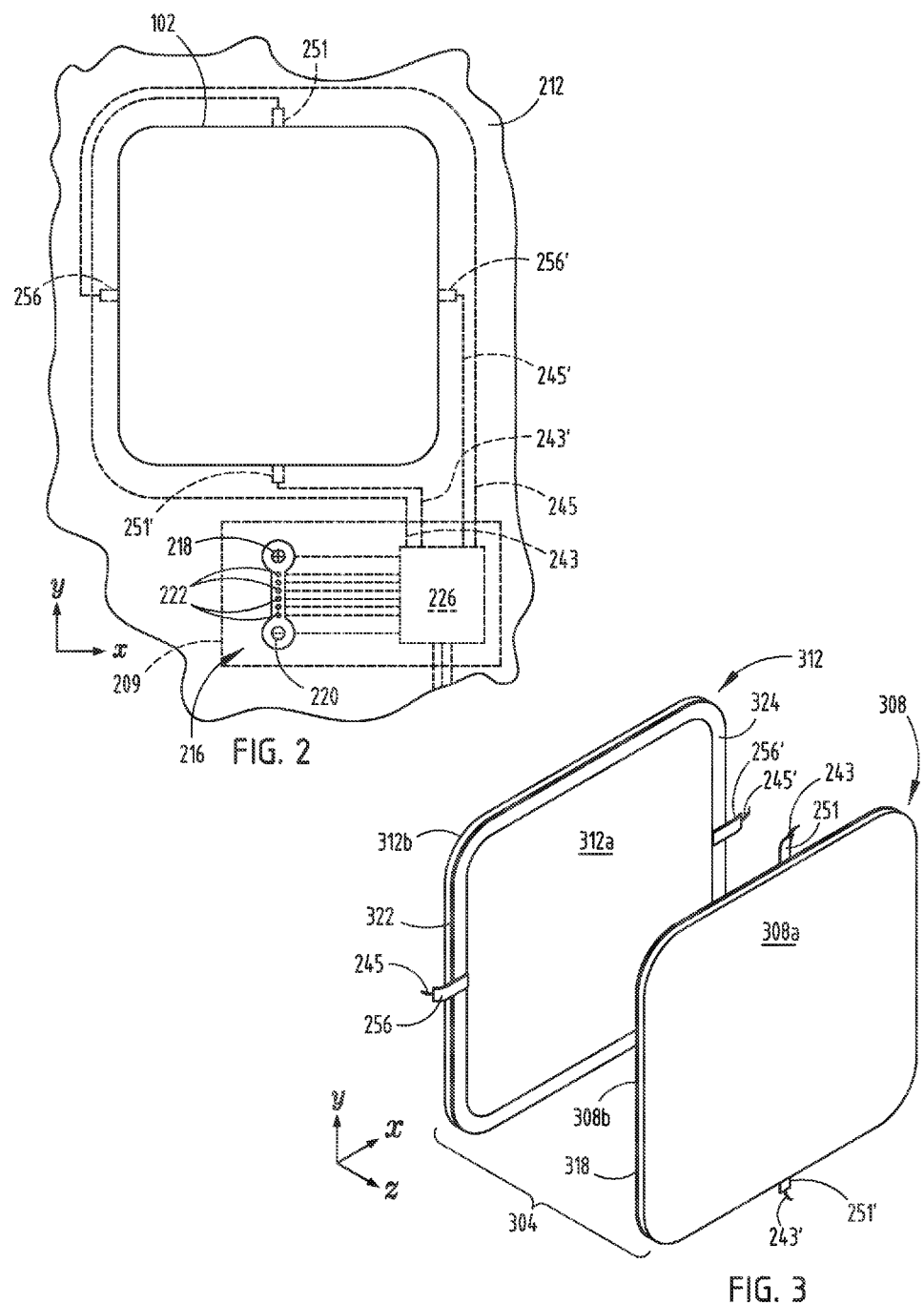

SWITCHABLE VARIABLE TRANSMITTANCE WINDOW ASSEMBLY

CROSS-REFERENCE TO RELATED APPLICATIONS

This application claims the benefit under 35 U.S.C. § 119(e) of U. S. Provisional Application Nos. 61/578,643, filed Dec. 21, 2011 and 61/623,612, filed Apr. 13, 2012, the entire disclosures of which are incorporated herein by reference.

BACKGROUND OF THE INVENTION

The present invention generally relates to variable transmission windows. More specifically, the present invention relates to systems and methods for switching the operation of such windows.

Variable transmittance electro-optic (EO) systems, such as electrochromic (EC) cell-based optical filters, have been proposed for use in architectural windows, skylights, and in windows, sunroofs, and rearview mirrors for automobiles. Such EC systems reduce the transmittance of direct or reflected sunlight during daytime through the EC cell in response to the amount of light incident upon the EC cell. Not only do such light filters reduce bothersome glare and ambient brightness, they also reduce fading and heat caused by transmission of sunlight through the window.

A particular incarnation of the EC cell-based optical filters—a variable transmission window—has not been widely accepted commercially for several reasons. First, such a window tends to be rather expensive due to the cost of materials required for its construction and manufacture, and the complexity of construction makes mass-production somewhat complicated. Additionally, EC windows tend to have lower life expectancy than conventional windows due to degradation of the EC materials used in the EC cells. The combination of added cost and lower life expectancy has deterred many architects, designers, and builders from using electrochromic windows.

The commercial use of variable transmission windows in vehicles designed for the transportation of passengers, such as, for example, busses, airplanes, trains, ships, and automobiles, is not common yet either.

SUMMARY OF THE INVENTION

Embodiments of the invention provide a substantially optically transparent cover for a variable transmittance window assembly. The cover comprises: a first optically transparent substrate having an area of at least 0.1 m$^2$; and a user interface (UI) on a surface of the substrate and devoid of moveable elements, the UI including visually perceivable indicia representing an operational parameter of the autodimming window.

According to other embodiments, a variable transmittance window assembly is provided that comprises: a housing structure defining an opening therethrough; an electro-optic cell having a clear aperture of at least 0.1 m$^2$ secured inside the opening; a dust cover affixedly disposed in the opening in a spaced-apart relationship to the electro-optic cell; and a user interface (UI) articulated to a surface of the dust cover and devoid of moveable elements, the UI including visually perceivable indicia representing an operational parameter of the autodimming window.

According to other embodiments, a substantially optically transparent cover is provided that comprises: a front surface; a rear surface; a plurality of fiber layers between the front and rear surfaces; at least two of the plurality of fiber layers each comprising a tab specific to a single fiber layer, the tab extending to an edge of the cover; and at least one light source optically connected to each of the tabs, such that the tabs are illuminated independently.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein:

FIG. 2 is a front view generally illustrating a variable transmission window and system for controlling the variable transmission window according to one embodiment of the present invention;

FIG. 3 is a perspective view of panels of an electrochromic element employing the variable transmission window illustrated in FIG. 2;

DETAILED DESCRIPTION

Figure 1:
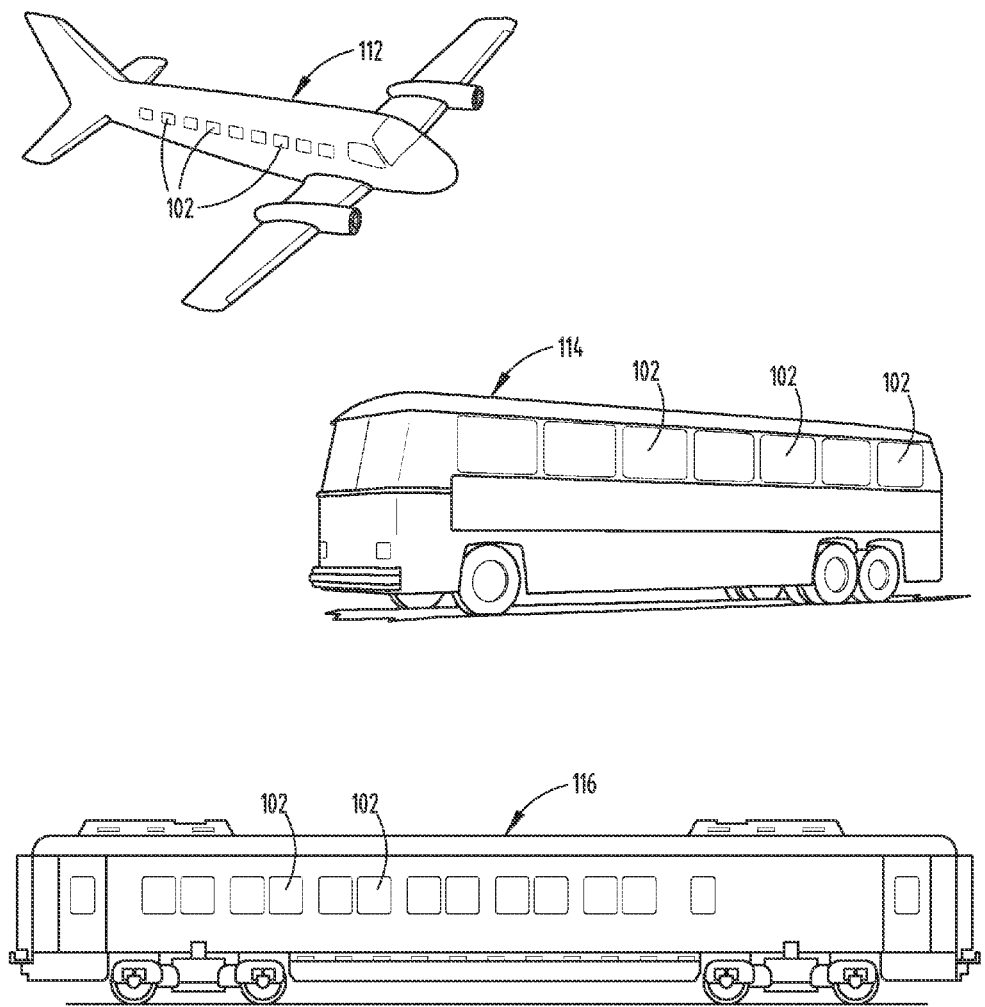
FIG. 1 is a general illustration of multi-passenger vehicles incorporating variable transmission windows in accordance with an embodiment of the present invention.

The present illustrated embodiments reside primarily in combinations of method steps and apparatus components related to a switchable variable transmittance window assembly. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The present invention pertains to a novel system and method for controlling the operation of variable transmission windows and also pertains to various window constructions and various constructions of mechanical and electrical connectors in those window constructions that make it practical to employ the described control system and method. Examples of variable transmission windows include a window that is configured to change its optical characteristics based on voltage(s) applied to an EC element of the window, such as the windows generally described in commonly assigned U.S. Pat. Nos. 6,407,847; 6,239,898; 6,597,489; 5,805,330; and 7,990,603. Examples of electrochromic devices that may be used in windows are described in, for example, U.S. Pat. Nos. 6,433,914; 6,137,620; and 5,940,201. Other examples of variable transmission windows and systems for controlling such windows are disclosed in commonly assigned U.S. Pat. Nos. 7,085,609 and 6,567,708. Disclosure of each of the above-mentioned patent documents is incorporated herein by reference in its entirety.

The challenges faced by the industry include, but are not limited to, providing effective, coordinated, individual and central control of multiple variable transmission windows; providing multiple modes of operation responsive to individual or collective passenger needs; ensuring uniformity of intracellular gap; providing a short dimming and/or clearing time; minimizing power consumption of an EC window system; and protecting the EC window cells against environmental factors such as moisture and power surges, excessive heat and physical external loads.

An additional challenge is presented by a need to provide user interfaces (UIs) that allow relatively unsophisticated users to understand and control the operation of the EC cell-based windows. Another challenge is to provide UIs that are devoid of moveable parts thereby addressing not only various styling concerns in the industry, but also improving reliability and longevity of the EC window systems. Such "smart" UIs should be discernible on the background of high light irradiance formed by natural light traversing through the autodimming window into a vehicle's cabin.

FIG. 1 is a diagram representing multi-passenger vehicles employing variable transmittance windows 102 and including, for example, an aircraft 112, a bus 114, and a train 116. It should be appreciated that other multi-passenger vehicles may employ variable transmittance windows 102. Any of the multi-passenger vehicles generally illustrated in FIG. 1 also includes a window control system (not shown) for controlling the operation and, in particular, the change of transmission of a window 102.

FIG. 2 is a general illustration of a variable transmission window 102 operably cooperated with a window control unit or mechanism 209, both of which are mounted in a multi-passenger vehicle such as an airplane. As shown, the window 102 and window control unit 209 are located adjacent to an inner reveal or shroud 212. The window control unit 209 conventionally includes a user input mechanism 216 having user input areas or user interfaces 218, 220 and, optionally, an indicator 222 such as an optical indicator including lights, for example. Also shown in hidden lines are slave control circuitry 226 and conduits 243, 243', 245, and 245' in respective electrical communication with electrically-conducting elements 251, 251', 256, and 256' of the window 102. The first and second user input areas 218, 220 are configured to be physically contacted (for example, pressed) by a user of variable transmittance window 102 to change a selected transmittance state of the variable transmittance window 102. In one conventional implementation, the areas 218, 220 include a user interface with depressible buttons or keys. The indicator 222 is configured to provide a visually perceivable indication of a state of operation of the window 102 such as, for example, a current state of transmission, the state of transmission selected by the user, whether the window 102 is in a transition between two transmission states, and/or whether there is any problem with operation of the window 102 ("error state") detected by the unit 209. The window control mechanism 209 is typically made of a material that is impervious to moisture, and is appropriately sealed to keep moisture and dirt from internal electrical and mechanical structures and slave control circuitry 226.

FIG. 3 provides a schematic perspective view of components of an EC element 304 of the window 102, including a front substrate 308 having a first surface 308a (in operation observable by the user) and a second surface 308b, as well as a second substrate 312 having a third surface 312a and a fourth surface 312b. The substrates 308, 312 may include thin and substantially transparent glass or plastic plates and, in a special case, glass or plastic plane-parallel plates, optionally including laminated plates. The substrates 308, 312 can have a thickness of less than about 1.2 mm, less than about 0.8 mm, or less than about 0.6 mm. In one embodiment, the thickness of the substrates is about 0.95 mm. In an alternate embodiment, the substrates may be bent or curved. As shown, the substrates 308, 312 are appropriately coated with electrically-conductive layers 318, 322 (such as transparent conductive oxide layers, for example ITO or AZO layers) that include electrodes internal to the element 304, as known in the art. In alternative embodiments, transparent conductive layers 318, 322 may be made of fluorine-doped tin oxide, doped zinc oxide, indium zinc oxide ($Zn_xIn_yO_z$), or the materials described in U.S. Pat. No. 5,202,787, incorporated herein in its entirety by reference, such as TEC 20 or TEC 15, available from Libbey-Owens-Ford Co. of Toledo, Ohio, to name just a few. Each of the conductive layers 318, 320 can have a sheet resistance of less than about $4\Omega/\square$, less than about $3.0\Omega/\square$, less than about $2.6\Omega/\square$, less than about $2.0\Omega/\square$, or less than about $1.0\square/\Omega$.

An annular band of highly conductive material 324 is optionally deposited around the perimeter of the substrate 312, and the electrically-conducting structures or tabs 256 and 256' are secured to the highly conductive material 324 and spatially separated from one another. The material 324 preferably includes silver, gold or aluminum (such as, for example, in a form of metallic flakes or particles dispersed in a hosting material). The highly conductive material 324 may be, for example, dispensed, applied by ink-jet printing or other known processes.

In further reference to FIG. 3, the tabs 256, 256' can be disposed at opposite sides of the substrate 312. Electrical power supplied from a power source with the use of the control unit 209 is delivered to the highly conductive material 324 and an EC medium (410, FIG. 4) disposed in a gap between the substrates 308, 312 of the EC cell 304. The front substrate 308 has similarly arranged electrical connections, including the tabs 251, 251' and the corresponding electrical conduits 243, 243' used to apply voltage(s) to the electrode associated with the front substrate 308. Generally, different voltage sequences may be applied to different mentioned electrical contacts. Such voltage sequencing may be effective for speeding clearing and reducing segregation.

With the above construction, the EC element 304 may be coordinated, in a continuous fashion, to assume a transmittance value anywhere between at least about 60% in a high transmittance state and less than about 0.05% in the lowest transmittance state or, preferably, lower than 0.001% in the lowest transmittance state. Conventional EC element-based devices having a clear aperture of the EC element of 0.1 m² or more do not display such a wide dynamic range of transmittance values, which beneficially differentiates an embodiment of the present invention. To achieve such dynamic range of transmission, each of the substrates 308 and 312, in combination with associated coatings including respectively corresponding electrodes 318, 322, has a transmittance value of at least approximately 65%, and more preferably approximately 78.6%, depending upon the EC medium that is used. The transmittance value of an embodiment of the invention is quickly tuned down or reduced from that of about 60% to less than about 0.2% in less than about 2 minutes. Conversely, the transmittance value may be tuned up or increased, in reverse, in less than about 5 minutes to clear the autodimming window. The clearing speed may be improved, for example, by providing a reverse bias across the electrochromic device rather than merely shorting it by grounding both conductive layers 318 and 322.

Overall, the structure of the EC element, such as the element 304 for use in autodimming windows (including various coatings, seals, plugs, spacers, elements of housing and or affixing means), has been taught in prior art and is not discussed hereinafter in any more detail. The commonly-assigned U.S. Pat. No. 7,990,603 provides an example of an autodimming window, and disclosure of this patent document is incorporated herein by reference in its entirety. The EC element 304 may be manufactured and filled with the EC medium using, for example, the process disclosed in a commonly-assigned U.S. Pat. No. 6,407,847, the entire disclosure of which is incorporated herein by reference. In particular, a fill hole may be provided in one of the substrates 308, 312 for filling the inside of the device with the EC medium. The fill hole is preferably located near the edge of the substrate, but just inside the sealed area so that it is covered by the reveal 212 surrounding the EC element-based window 102. In this regard, it may be desirable to make the EC element 304 in a nonsymmetrical shape (i.e., such as to define an EC element corner that is less rounded, for example, where the fill hole is located), thereby facilitating concealment of the fill hole behind the reveal. The fill hole may be covered or plugged by a glass slide, a plug material (made, for example, of cationic epoxy material), or the like.

Figure 4:
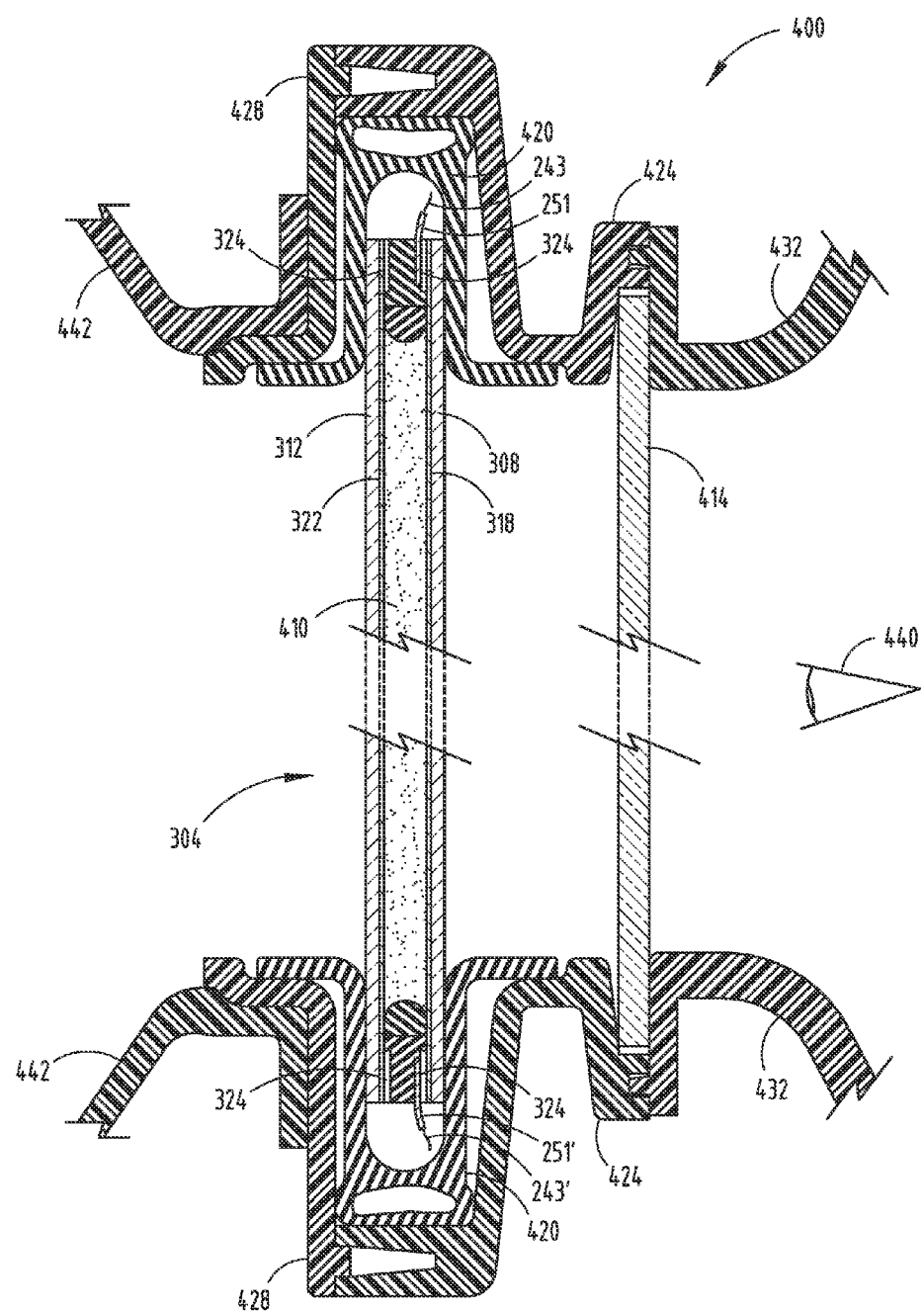
FIG. 4 is a partial cross-sectional view taken through line IX-IX of the variable transmission window and supporting structure illustrated in FIG. 2.

FIG. 4 is a side plan view showing, in cross-section, an embodiment 400 of the variable transmittance window 102 of FIG. 2, including the EC element 304 filled with an EC medium 410, a dust cover 414, and elements of a window control system 209 of FIG. 2. As shown, the EC element 304 has its perimeter enclosed and circumscribed by an elastomeric bezel 420. The dust cover 414 is typically made of a substantially optically-transparent polymeric material such as, for example, Plexiglas. The bezel 420 and the enclosed EC element 304 are further secured in place by a middle reveal 424 and an outer reveal 428. In an alternative embodiment, the elastomeric bezel 420 and the enclosed EC element 304 are secured in place by structures similar to the middle and outer reveals 424, 428 such as, for example, frames or bezels. The reveal (or shrouds) 424, 428 and the elements secured by them are further joined to and secured in place by an inner reveal 432 and other elements of housing structure such as element 442, for example. The inner and middle reveals or shrouds 432, 424 are additionally configured to house the dust cover 414 protecting the EC element 304 from force incidentally-applied from inside the vehicle, from the side of a user 440. Additional features of the structural elements housing the EC element 304 of the window 102 are discussed in, for example, U.S. Pat. No. 7,990,603.

Figure 5:
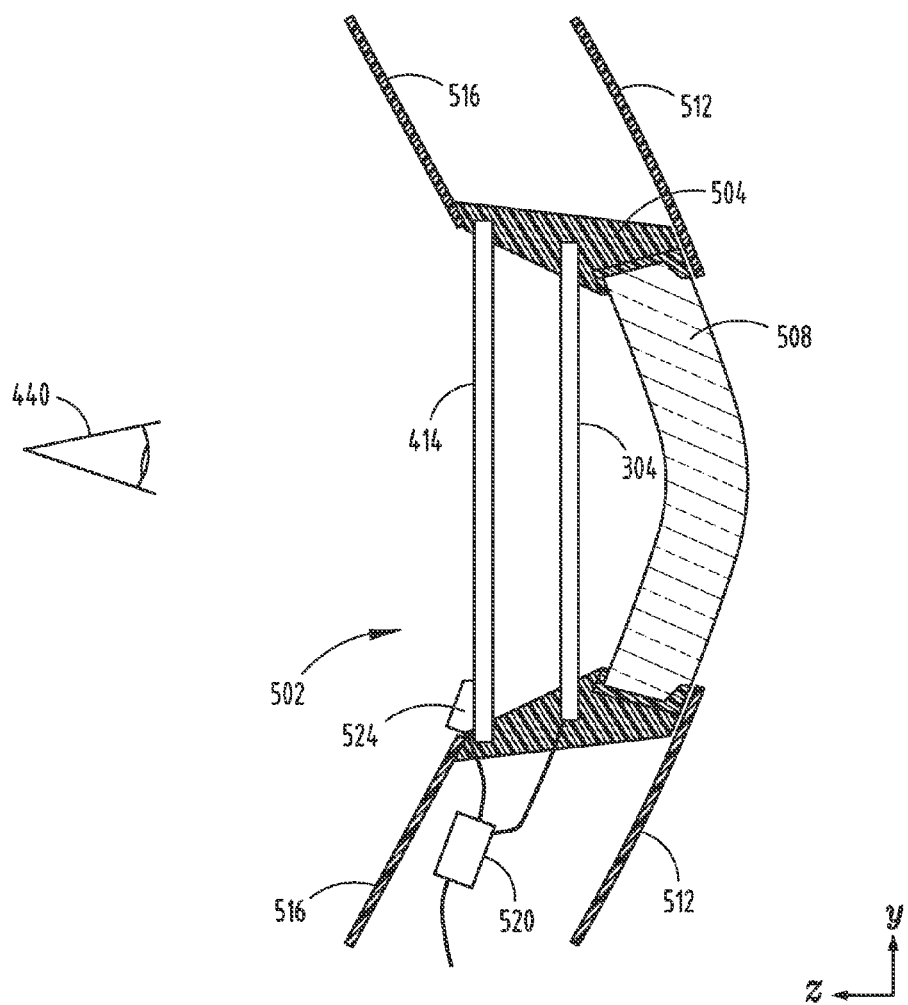
FIG. 5 is a simplified cross-sectional view of an embodiment of the window assembly.

FIG. 5 provides an additional schematic illustration of the autodimming window structure 502 and the surrounding housing elements and walls of an aircraft with which such structure 502 is used. As shown, the autodimming window structure 502 including the EC element 304 and the dust cover 414 are supported by a surrounding housing element(s) 504 including reveals and/or bezels as discussed above, which is optionally cooperated with a structural aircraft cabin window system or pressure pane 508 configured to protect the interior of the aircraft from the barometric pressure difference between the atmosphere internal to the aircraft and that of the outside. The housing element(s) 504 is mechanically and hermetically articulated to an aircraft hull 512 and the interior wall structure 516. The operation of the window 502 is controlled, at least in part, by autodimming electronic circuitry 520 configured in electrical communication with the EC element 304 and the user interface (UI) 524 that, in one implementation, includes a UI containing mechanically moveable buttons or keys or switches such as the UI 218, 220 of FIG. 2, for example.

In further reference to FIG. 5, conventional incorporation of the moveable UI components 524 into the sidewall 516 without additional precautions is recognized to increase the level of noise such as rattling or squeaking of the components, which may reduce the user's comfort. More importantly, however, a moveable actuator-based UI is understandably prone to malfunction caused by button jamming within the button opening and/or breakage. Accordingly, embodiments of the elements of the UI discussed below include various functional elements such as switches, sensors, and other actuators of the EC element-based window assembly (referred to hereinafter as "window assembly") that are operated with no mechanical activation. Such switching elements or sensors are activated by a user input that may include placing a user's finger in close proximity of or even touching the switching element or sensor. In response to such user input, the switching element activates, triggers, or switches one of the auxiliary devices that are associated with the window assembly and that may exchange visual or audio information with the user. For example, an auxiliary device may be a display that forms an image to be observed by the user within the clear aperture of the window assembly.

In describing embodiments of a non-mechanically activated UI of the invention, references are made to a legend (sometimes referred to as indicia or icon) that corresponds to a particular actuator associated with the UI (such as sensor or switch, for example). In this context, a legend refers to a physical marking or an indication that is disposed on one of the surfaces of an embodiment in such a fashion as to be perceived to correspond to a given actuator and that provides identification of the given actuator and its operation to the user of the UI. Generally, a legend or its equivalents may be configured in an opaque, transflective or translucent layer deposited on or inserted into a surface (by, e.g., masking out a portion of the layer during deposition or by pre-molding an inlay that is further implanted into a component) to form a required graphical or textual identifier that is appropriately made visible to the user, from the front of the assembly. For example, a legend may be configured in an overlay patch disposed on a front surface of the dust cover or on a mounting element; in a thin-film stack on either the rear surface of the dust cover or the front surface of the EC element; or in a surface of the mounting element that is visually accessible by the user from the front of the assembly. According to one aspect of the present invention, one way of causing a legend to be visible is to highlight it with a source of light associated with and located in proximity to the window assembly. It is understood that even when only a particular implementation of a legend is referred to in a description of an embodiment, other appropriate implementations are considered to be within the scope of the invention and are implied.

Accordingly, embodiments of the UI of the invention include switches that are labeled, for identification purposes only, as an optical switch, a capacitive switch, and an FTIR switch. The terms "switch" and "sensor" in the context of UI embodiments discussed herein are used interchangeably. According to what is discussed below, either positioning the user's finger in proximity of a sensor or a switch of an embodiment, or a gentle touch on (or finger sweep across or multiple-finger sensing on) a sensing pad located adjacent to the surface of the window assembly induces the window assembly to activate a required function such as, for example, dimming or clearing of a window assembly.

Because the operation of the user-interface embodiments of the invention may include touching an area of the front surface (referred to hereinafter as "input area") of an element of the window assembly such as a dust cover, for example, this front surface may be appropriately treated with a fingerprint dissipating coating such as the Opcuity film provided by Uni-Pixel Inc. (Clear View™). If an input area is configured in the peripheral area of the clear aperture of the window system, a matte finish and/or surface treatment resulting in a textured surface may be used to resist fingerprints. For example, a portion of the peripheral area of the first surface corresponding to a peripheral area of the dust cover may be roughened (via laser ablation, for example) to produce a region that lacks specular reflective characteristics and reflect incident light in a diffusive fashion and has a hazy appearance. Due to the surface structure, the visibility of a fingerprint left by the user on such surface will be reduced as compared to a glass surface characterized by specular reflection.

According to one configuration, an embodiment of a non-mechanical UI that is devoid of moving elements is disposed at the dust cover 414 of the window assembly. It is appreciated that, generally, such dust cover-hosted implementation of the UI improves aesthetics of the window assembly, lowers its cost and/or weight (the latter being an important consideration in aircrafts), makes the UI easily perceivable visually and window assembly more durable and easier to install.

Figure 6A:
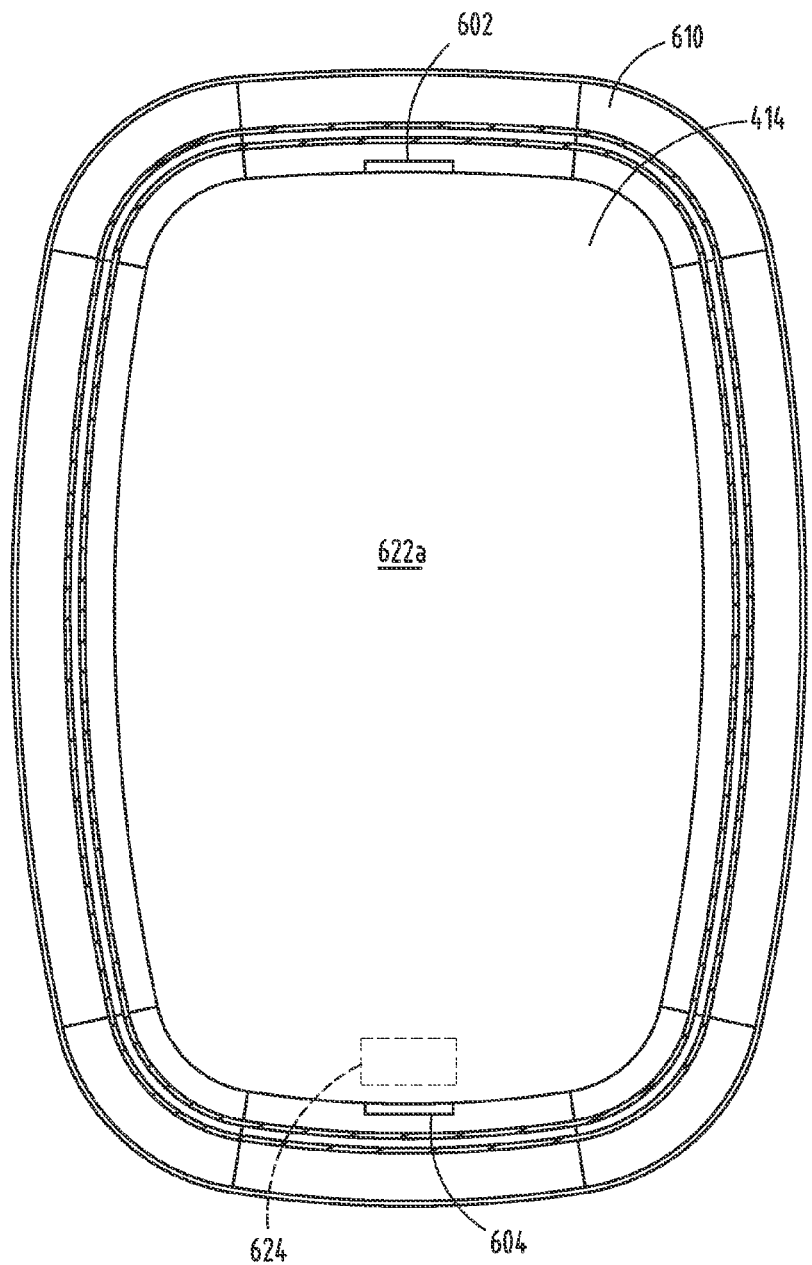
FIG. 6A is a partial front plan view of an embodiment including an optical sensor articulated with a dust cover.
Figure 6B:
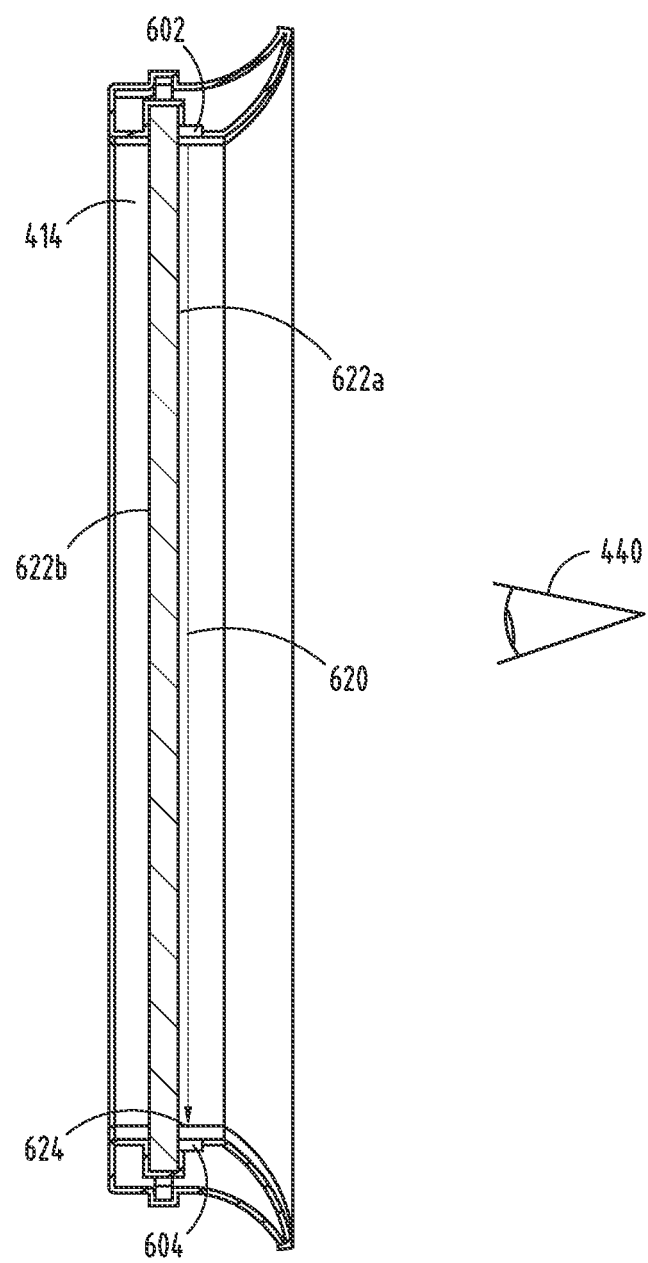
FIG. 6B is a side cross-sectional view of an embodiment including an optical sensor articulated with a dust cover.

Optical switch-based implementations of such UI may include, for example, at least one of a line-of-sight sensor (interrupter) and a reflective sensor. FIGS. 6A, 6B illustrate an optical interrupter that is employed in association with the dust cover 414 of the window assembly such as the window assembly 400 of FIG. 4, for example. This optical interrupter-based UI includes an emitter 602 and a detector 604 pair (although multiple pairs may be employed that correspond to multiple interrupters). Detector 604 may be an IR photodiode and emitter 602 may be an IR LED. A shown, emitter 602 and receiver (detector) 604 form a line-of-sight sensor and are respectively disposed in opposing (as shown, top and bottom) portions of a window housing element 610 (such as the reveal 432 of FIG. 4, for example), which surrounds an edge surface of the dust cover 414 and slightly protrudes over its front surface facing the user towards an in-aircraft portion of the window assembly. When the user interrupts an optical communication established between the emitter 602 and detector 604, shown with an arrow 620 indicating an optical path in FIG. 6B, by placing a finger across this optical path, the detector 604 is caused to lose the reception of the optical signal. In response to interruption of such optical communication, the electronic circuitry 520 (FIG. 5) triggers the response of the window assembly by, for example, applying or removing the voltage between the electrodes of the EC element of the assembly such as to change the transmittance of the autodimming window. To increase a signal-to-noise ratio of the embodiment and to reduce or reject signal interference from ambient lighting, the operation of the emitter 602 may be modulated at a high frequency, thus allowing the detector 604 to be AC-coupled. Considering the fact that some components used in an exterior structural portion(s) of an aircraft window include elements protecting the inside of the aircraft from external IR light, in one implementation the IR photodiode is adapted to operate within IR spectral bandwidth(s) that are blocked or attenuated by such conventional components.

A window assembly function to be initiated by the user input through activation of the line-of-sight sensor 602, 604 may be indicated with a use of a graphic- or text-based legend 624 imprinted on or otherwise associated with at least one of the surfaces 622a, 622b of the dust cover 414 of the window and located, e.g., within the clear aperture of the dust cover 414 outlined by the visible boundaries of the mounting element 610. In a related embodiment, when the window assembly includes thin-films or coatings disposed on the dust cover 414, such legend 624 may be appropriately formatted in such coating or film by, for example, judiciously masking a portion of the coating during the deposition process. Optionally, the legend 622 may be made visible by backlighting that is provided, for example, by an LED, optionally with appropriate apertures or masking, or with the use of an illuminated LCD or an OLED display from behind the dust cover 414. Alternatively, the legend 624 may be incorporated in the assembly as a permanently visible graphic.

In one implementation, the channel 620 of optical interconnection between the emitter 602 and detector 604 of a line-of-sight sensor is established through optical windows covering the emitter and detector. Such optical windows may be fabricated from IR-grade transparent or translucent plastics and, therefore, may be color-matched with the reveal 610 to disguise the sensor areas. In a specific embodiment, the emitter/detector pair(s) may also be mounted in the reveal 610 in such a way as to provide a small gap near the glass that is covered in front by IR light-transmitting plastic.

In another implementation related to that of FIGS. 6A, 6B, the detector is disposed away from the clear aperture of the window system, in the depths of the housing/mounting elements, and judiciously configured light pipes are used to deliver IR light to such detector. Alternatively or in addition, in a related embodiment, the emitter may also be disposed in the depths of the housing of the window system, delivering light towards the front of the window system via another light pipe.

Figure 7:
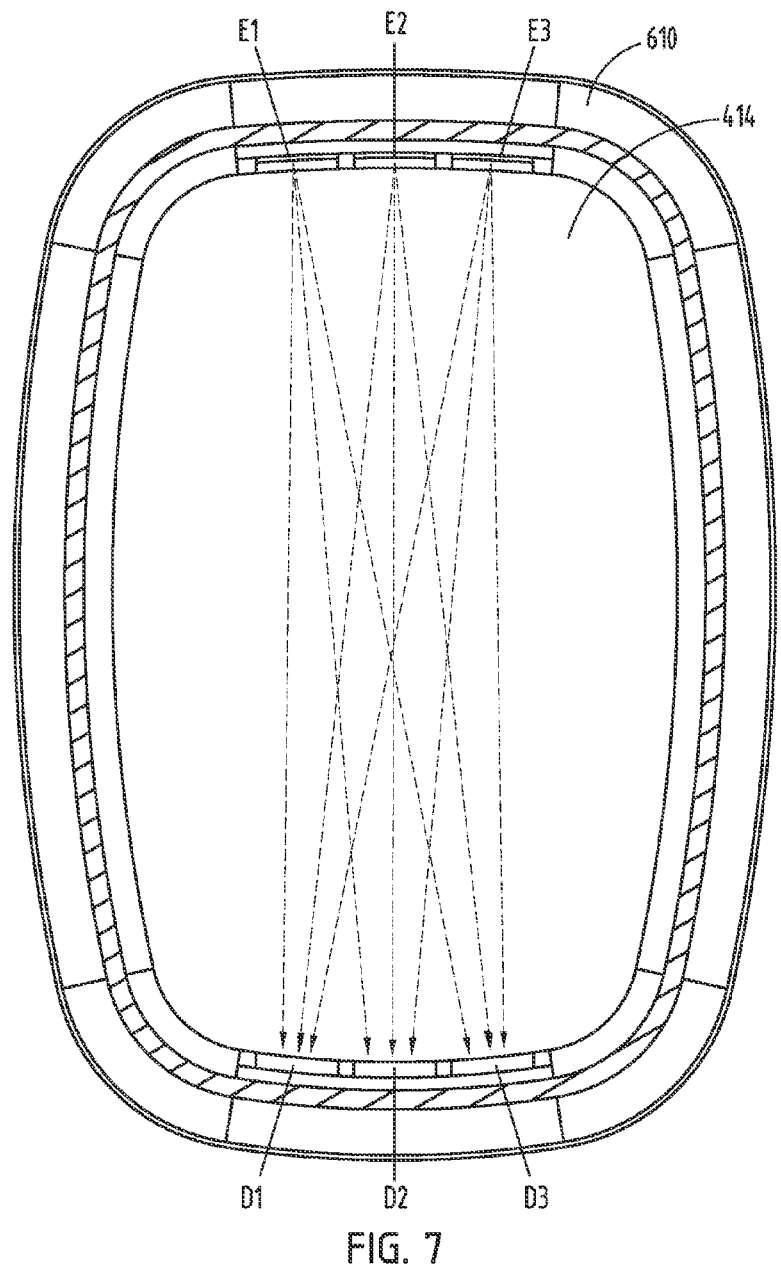
FIG. 7 is a partial front plan view of an alternative embodiment including an optical sensor.

Although only a single emitter/detector pair is shown in FIGS. 6A, 6B, generally a plurality of such pairs may be employed. To this end, FIG. 7 schematically illustrates a specific embodiment including 3 line-of-sight sensors (3 pairs of emitters/detectors (E1, D1), (E2, D2), and (E3, D3)). In such a multi-sensor case, a process of identification of which line-of-sight light path among those connecting the emitters and the detector is interrupted by the user may be facilitated by operating the emitters E1, E2, and E3 in an alternating fashion. In one embodiment, the emitters are turned "on" one at a time. Once a given emitter is switched "on," all detectors are tested for signal. Based on which light path is blocked by the user's finger, six operational modes can be identified, as shown in Table 1 corresponding to the embodiment of FIG. 7. These modes allow the electronic circuitry of the window assembly system to decide which light path connecting which pair of the emitter/detector has been blocked by a user (based on, e.g., a look-up table) and, consequently, to activate a corresponding function of the window assembly:

TABLE 1

| Emitter/Detector (0 = blocked, 1 = signal) | | | | | | | | | |
|---|---|---|---|---|---|---|---|---|---|
| E1/D1 | E1/D2 | E1/D3 | E2/D1 | E2/D2 | E2/D3 | E3/D1 | E3/D2 | E3/D3 | Zone |
| 0 | 0 | 0 | 1 | 1 | 1 | 1 | 1 | 1 | 1 |
| 1 | 1 | 1 | 0 | 0 | 0 | 1 | 1 | 1 | 2 |
| 1 | 1 | 1 | 1 | 1 | 1 | 0 | 0 | 0 | 3 |
| 0 | 1 | 1 | 0 | 1 | 1 | 0 | 1 | 1 | 4 |
| 1 | 0 | 1 | 1 | 0 | 1 | 1 | 0 | 1 | 5 |
| 1 | 1 | 0 | 1 | 1 | 0 | 1 | 1 | 0 | 6 |

While the emitter and detector pairs are shown at the top and bottom of the window, it is understood that a variable number of sensor pairs may also be arranged in a side to side, or in a grid pattern to achieve the desired sensing areas. An indicia or legend employed with this embodiment may be dynamic and configured to be perceived as located on a surface of the window assembly. For example, a legend may be formatted as an options menu that is not highlighted from behind (not visible to the user) during normal operation of the window assembly. However, activation of a UI by any user input triggers highlighting of the indicia. In various embodiments, the indicia are configured with a bitmapped display, or with a segmented display or with masked backlit regions. Additionally, information contained in the legend may also be expressed through brightness of a legend-highlight or color (e.g., green or bright to indicate that a function is enabled and red or dim to indicate that a function is disabled).

Figure 8A:
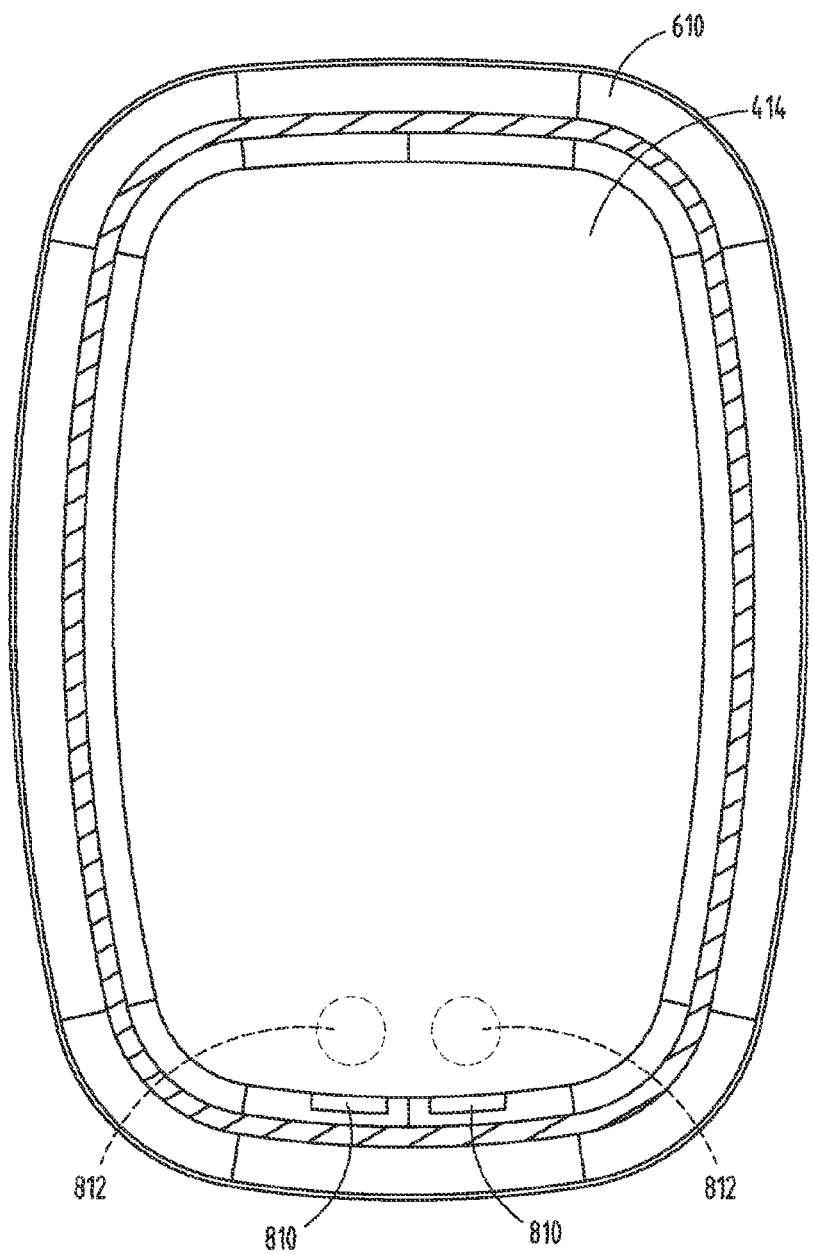
FIG. 8A is a partial front plan view of another alternative embodiment including an optical sensor articulated with a dust cover.

Another optical switch-based implementation of the UI for use with an autodimming window system of the invention includes optical reflective sensors operating in, e.g., IR light, such as those shown in FIG. 8A. The emitters and detectors of the "reflective" embodiments are disposed on the same side of the window assembly, as shown in the bottom portion of it. Specifically, a group 810 of emitters is disposed in the mounting element 610 of the assembly, while a group of detectors (not visible in FIG. 8A) is positioned at a back portion of the window system with respect to the observer so as to be aligned with eye-hole openings 812. The sensor system is triggered when light emitted by an emitter from the group 810 reflects from the user's finger, placed in proximity to or in contact with the dust cover 414, and is detected by a detector of the group 812 through a corresponding eye-hole opening. The use of a visible-light reflective sensor instead of the IR light-based sensor may provide an additional advantage of illuminating an area of interest of the window system for the user. In such an embodiment, operation of the emitter may also be modulated at a high frequency to increase a signal-to-noise ratio and reject interference due to ambient light. To minimize direct coupling of light from the emitter to the detector in the absence of the triggering action by the user, an appropriate optical blocking barrier may be disposed between the emitter and the detector. A legend can be combined with an optical opening (e.g., overlaid upon it or be formed in one of the thin-film coatings that are internal to the EC cell, as discussed above) to convey the information about the purpose of a switch to the user.

Figure 8B:
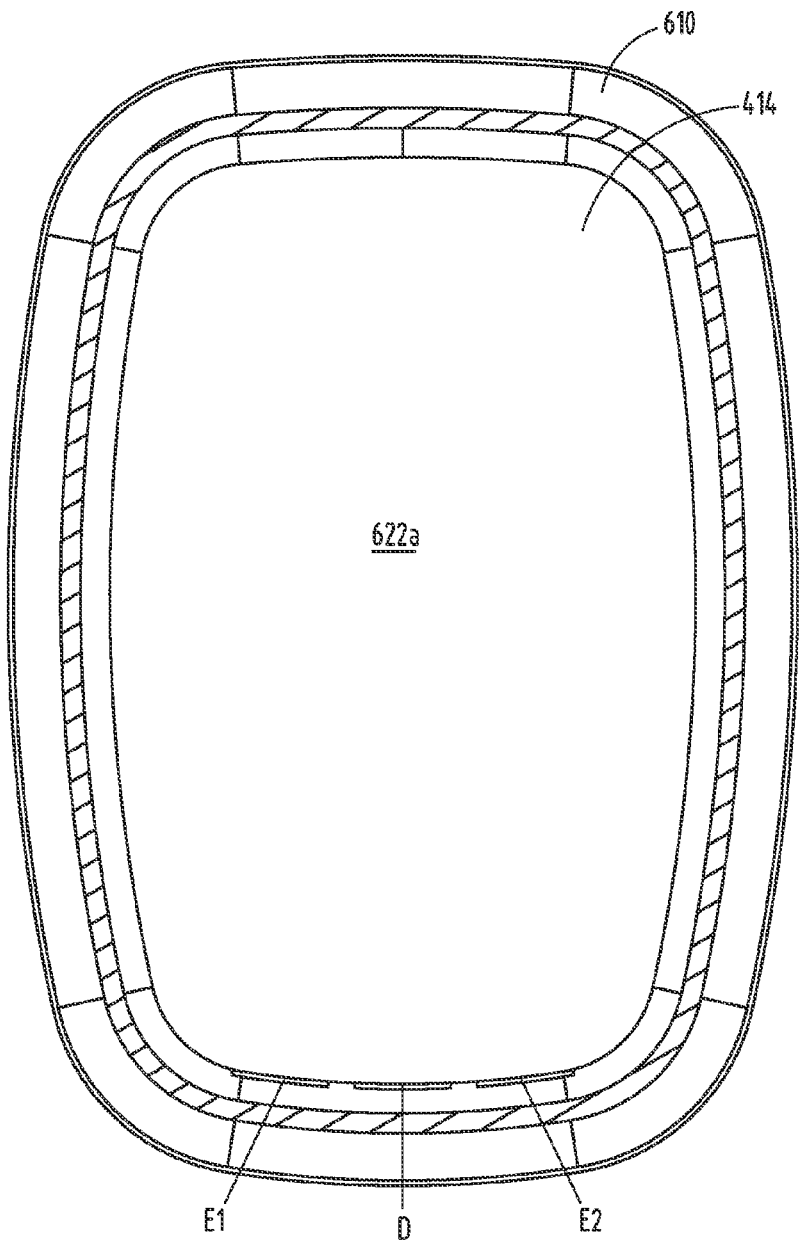
FIG. 8B is a partial front plan view of yet another alternative embodiment including an optical sensor articulated with a dust cover.

FIG. 8B illustrates an alternative embodiment of the UI operating in a reflective mode that, in addition to detecting the user input, is adapted to provide positional information in a touch-type sensor application when used with an EC element-based window assembly. As shown, a pair of IR emitters E1, E2 is used in conjunction with a single receiver D disposed between the emitters. It is understood that lines-of-sight corresponding to the optical devices E1, E2, and D are directed along the front surface 622a of the dust cover 414. In operation, the emitters E1, E2 are alternately enabled, and the user establishes optical connections between the emitters and a detector by placing a finger (which, therefore, operates as a reflector) in proximity to the detectors thereby reflecting portions of light emanating from each of the emitters towards the detector. The reflected light is measured by the photodiode D. The ratio of the signals associated with the emitters provides the system with positional information about a location of the "reflector" (i.e., left or right with respect to the detector D). The sum of the two signals provides vertical position information. As a result, a window assembly employing the embodiment of FIG. 8B is enabled to sense and spatially resolve multiple positions, across the surface of the window assembly, at which the user communicates with the UI of the window assembly. At these positions, virtual "touching pads" of a touch-screen sensor or switch may be deployed. A legend for such a sensor can be provided in a fashion similar to that described in reference to FIG. 6A. In a specific embodiment, a touch-sensor system such as that provided by the QuickSense product line of the Silicon Labs (Austin, Tex.; www-.siliconlabs.com) can be used. Because the described system can resolve both X and Y positional information, multiple user-interface options are enabled. In one implementation, virtual touch pads are configured with the use of a programmable LCD or OLED display located behind the dust cover. Pressing these virtual touch pads causes the activation of corresponding functions. The information about the lateral (x,y) position of the user's finger at the dust cover 414 can be optionally used to control a cursor, similar to that of a personal computer. Tapping or pressing various regions of the display would act like a mouse click on a computer. Dragging a finger across the surface 622a of the dust cover 414 can also act like a "drag" function, and is useful for actions such as scrolling a map in a navigation display or to switch between menu pages.

In a different implementation, and in further reference to FIG. 5, an incarnation of a capacitive switch (or, alternatively, a field-effect switch) or sensor is used, instead of the mechanical button 524, in cooperation with the dust cover 414 of the window system of the invention to trigger the electronic circuitry 520 such as to cause a change of the state of operation of the window system of the invention. Generally, capacitive sensors that detect the presence of a finger in proximity to a particular sensing pad are known. Various capacitive or field-effect sensors are available from the Silicon Labs, TouchSensor (Wheaton, Ill.; www.touchsensor.com), AlSentis (Holland, Mich.; www.alsentis.com), and Microchip (Chandler, Ariz.; www.microchip.com). Some capacitive sensors operate on the basis of a field effect and are structured to include a conductive sensor area surrounded with a conducting ring. Capacitive coupling between these two conductors is increased when the user places his finger in close proximity.

Figure 9A:
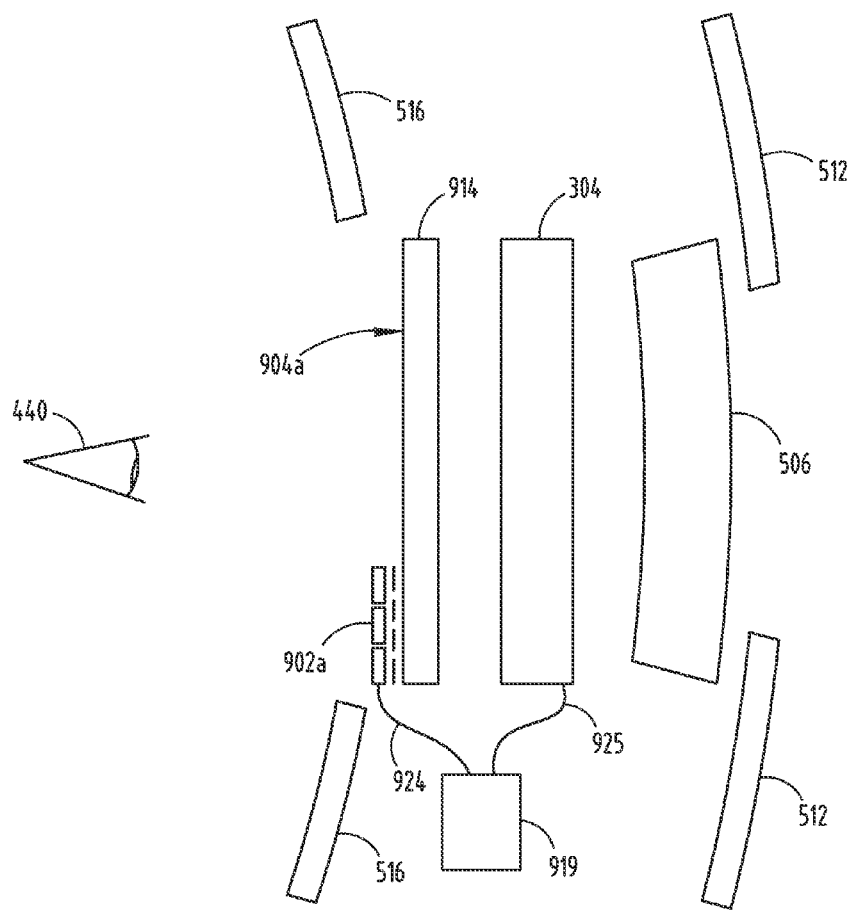
FIG. 9A is a side cross-sectional view of an embodiment including a capacitive switch.
Figure 9B:
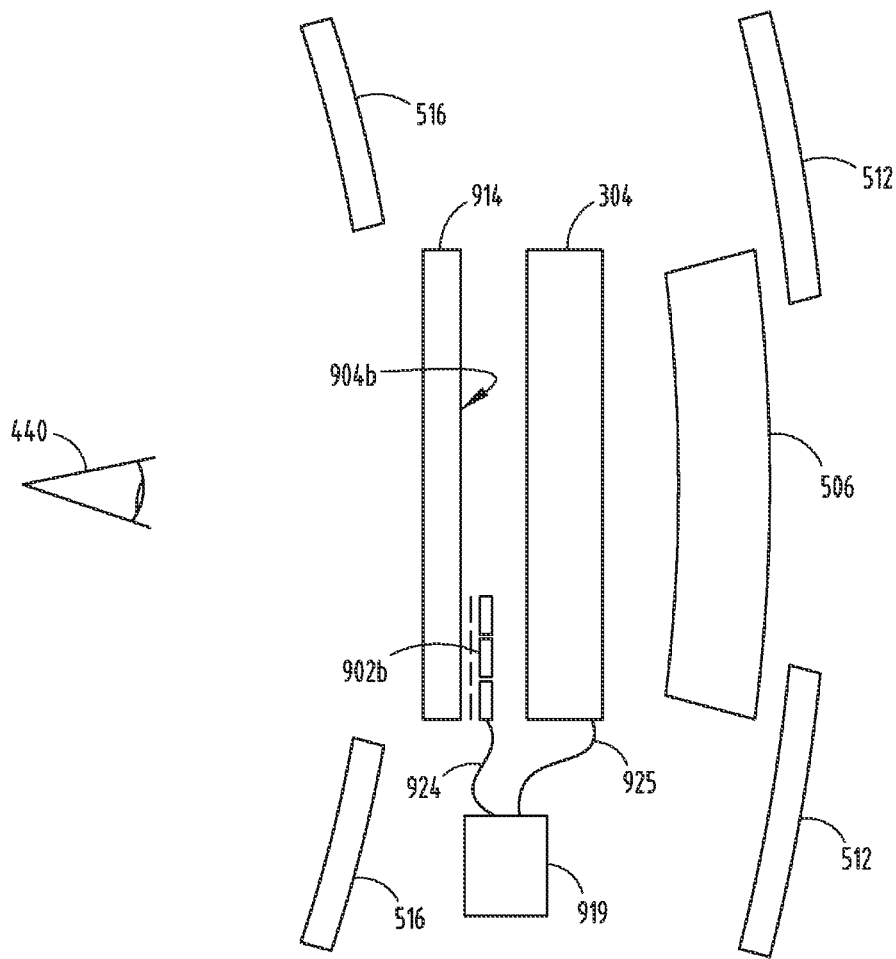
FIG. 9B is a side cross-sectional view of another embodiment including a capacitive switch.
Figure 9C:
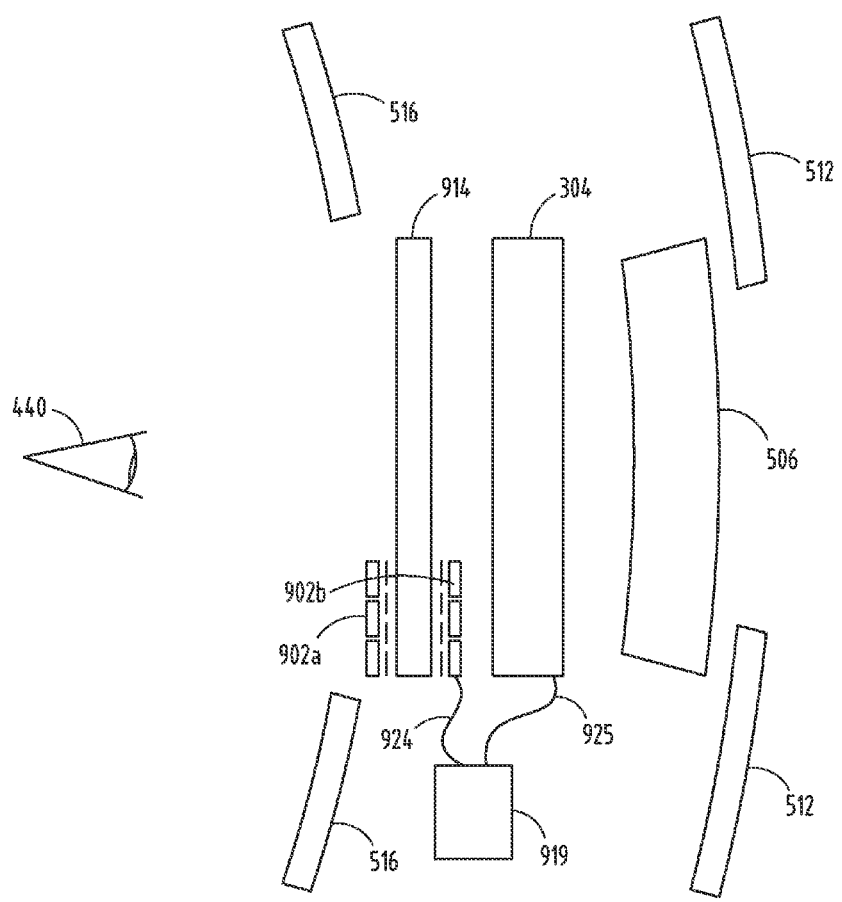
FIG. 9C is a side cross-sectional view of another embodiment including a capacitive switch.

According to an embodiment of the present invention, as shown in FIGS. 9A, 9B, a capacitive sensor of the UI of the window assembly is configured in an "on-glass" fashion or in a "through-glass" fashion. Accordingly, at least one sensing area (corresponding to an electrically-conducting sensing pad) 902a, 902b of the switch is disposed (as shown in a dashed line) in association with either a front surface 904a or a rear surface 904b of the dust cover 914 or, in a specific case, with both surfaces. The sensing pad is in electrical communication with an electronic circuit 919 disposed outside of the clear aperture of the window. If multiple sensing areas are present, these areas are electrically isolated from each other. As shown in FIG. 9A, for example, the front conductive pad 902a is electrically extended through a connector 924 to the outside of the window clear aperture (for example, to the electronic circuit 919, which, in turn, may be connected through an electrical extension 925 to the EC cell 304). In a specific embodiment, shown in FIG. 9C, both the front and back conductive pads are present on the opposite surfaces of the dust cover 914. In this case, the pads 902a, 902b can have different sizes. In particular, configuring the back conductive pad 902b to have a smaller lateral extent than that of the front conductive pad 902a facilitates the increase of signal-to-noise ratio of the capacitive sensor by reducing offset capacitance to the ground of the system.

Suitable top conductive areas or pads may be produced by metallic coatings manufactured with electroplating, vacuum deposition, or adhesive-based conductors, metallic or carbon-based conductive inks. The electrically-conductive coatings may employ copper, nickel, stainless steel, or transparent coatings such as ITO. Non-transparent coatings can be patterned in a way such as to allow light from a backlight to pass through and illuminate a legend corresponding to a conductive pad and including visually perceivable information for the convenience of the user.

Figure 12:
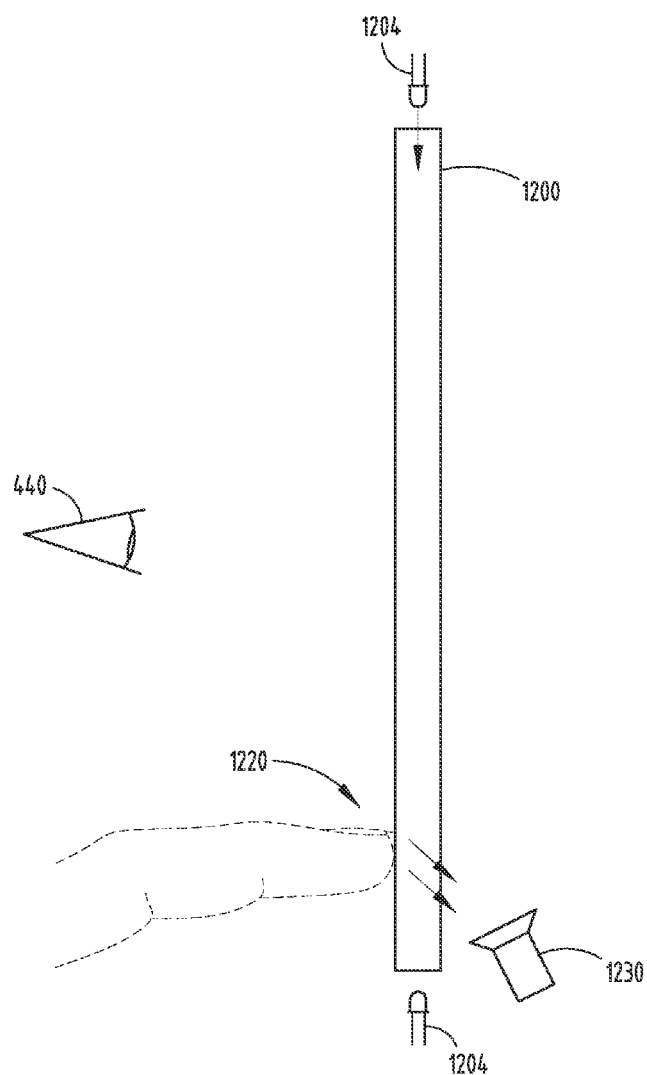
FIG. 12 is a diagram of an embodiment including an FTIR-sensor.

Another implementation of an actuator for use with a touch-based UI of the present invention includes a frustrated total internal reflection (FTIR) sensor. As shown in FIG. 12, for example, IR light from the light sources such as IR LEDs 1204 is coupled through an edge of the dust cover 1200 of the window assembly into the body of the dust cover, by which it is channeled through a dimension of the dust cover due to total internal reflection (TIR). When the user comes into contact with the front surface of the dust cover (in the area 1220), the TIR is frustrated and a portion of the IR light leaks from the dust cover and is picked up by an IR imager (such as an IR camera 1230) disposed in the window housing structure. In one embodiment, the front surface of the dust cover is optionally overlaid with a compliant layer of material adapted to increase the touch sensitivity of the device and making it responsive to a small amount of pressure.

Regardless of a specific way of implementing sensor(s) of a non-movable UI of the present invention, formation and highlighting of visually-perceivable indicia associated with and representing the functionality of the UI remains of a particular interest.

Figure 10A:
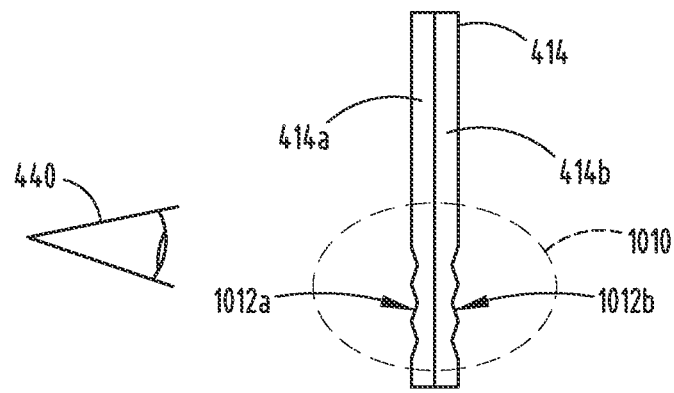
FIG. 10A is a diagram illustrating a configuration of an indicia of the UI.

To this end, in one implementation, indicia or a legend is formed by texturing an area of at least one of the first and second surfaces of the dust cover of the window assembly (such as the dust cover 414 of FIGS. 4, 6A, 6B, 7, 8A, 8B, 9A, for example). In reference to FIG. 6A, for example, the front surface 622a of the dust cover can be textured, within the limits of the patch 624, by creating a relief in the surface 622a that is patterned to display a graphical sign or text indicative of the operation of the corresponding switch of the UI. In addition or alternatively, another identical relief can be formed in the rear surface of the optically-transparent dust cover 414. FIG. 10A is a diagram schematically showing a legend 1010 that includes two relief areas 1012a, 1012b patterned in a substantially identical way and substantially co-extensive as seen along the z-axis. As perceived by the observer/user 440 located within the aircraft, such legend 1010, when highlighted or lit, displays a quasi-three-dimensional indicia associated with a non-movable element of the UI of the invention. Surface patterning is carried out with, for example, laser ablation, etching, grinding or blasting of the dust cover surface(s) with abrasive medium, molding, or imprinting with the use of an optionally heated press-form. In a related modified embodiment, the two relief areas 1012a, 1012b can be slightly laterally (in the xy-plane) offset with respect to one another such as to establish a preferred angle at which light, delivered to the legend 1010 as discussed below, is redirected towards the user 440. In another related embodiment, the indicia or marking is formed inside the body of the dust cover (for example, with the use of a pulsed laser source creating a judiciously organized pattern of refractive index nonuniformities in the dust cover thickness).

Worth considering is to ensure that light redirected by the textured input area of the dust cover towards the user should be controlled and, in particular, maintained above a certain threshold level. In this regard, if light highlighting the textured area is delivered to such patterned or textured area from only one direction, the textured area may not be illuminated evenly. Accordingly, multiple sources of light spatially distributed around the textured area may be preferred. Adjustment of the surface texture or optional modifications of the dust cover substrate that increase light scattering from the lit textured input area may be employed. The use of low divergence angle LEDs as light sources may optimize the amount of light delivered towards the textured area of the dust cover. In one example, the LEDs are chosen having an angle of divergence substantially equal to or lower than the numerical aperture of the lightguide formed by the dust cover.

Scratches left by a user on the dust cover (and, in particular, in the input area containing the indicia) may scatter visible light and, therefore, highlight a portion of the dust cover even in the absence of backlighting or edge-lighting of the indicia. In the related embodiment, the spatial pattern or pitch formed in the dust cover to define the indicia as per FIG. 10A, for example, may be filled with or covered by a fluorescent material such as a UV phosphor. Highlighting of these indicia is effectuated, then, with the use of source-producing UV light, reradiated to the user in a form of fluorescence, for example, and thereby visibly distinguishing the indicia from ordinary scratches.

The use of fluorescent materials may be extended, according to an embodiment of the invention, to distinguishing among the elements of a single multi-element indicia. In one configuration, when the specified indicia corresponding to a specified portion of the UI of the invention contains several graphical and/or textual elements that have to be either operated independently from one another or highlighted in a different color, such indicia elements may be associated with materials that fluoresce in different portions of visible spectrum. For example, if the indicia contains an encircled letter (such as "©"), a textured portion of the indicia corresponding to the circle can be filled with a UV phosphor of the first type and the textured portion of the indicia corresponding to the letter can be filled with a UV phosphor of the second type. Depending on the types of the phosphors, they may be caused to fluoresce at different wavelengths and/or activated in response to different wavelengths, thereby decoupling the operation of different portions of the indicia from one another.

Figure 10B:
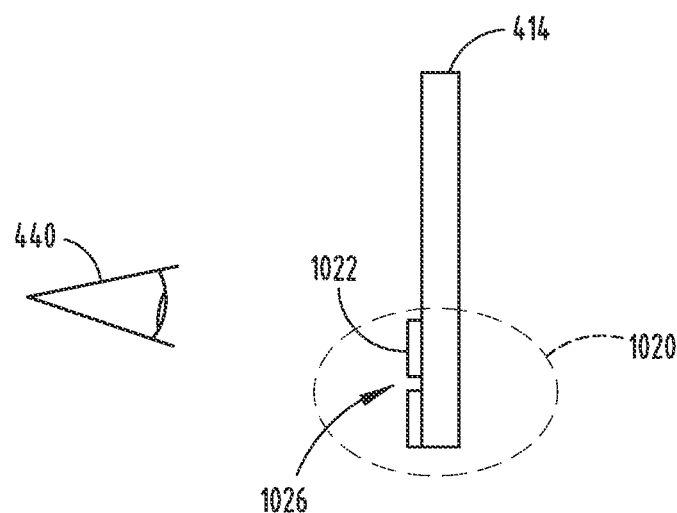
FIG. 10B is a diagram illustrating another configuration of an indicia of the UI.

In another implementation, and in reference to FIG. 10B, the legend area 1020 is conventionally configured to be opaque or nearly opaque, by either attaching a piece of applique 1022 to or simply blackening or coloring the area 1020 with the exception of a portion 1026 of the area 1020 through which light, used to highlight the legend as discussed below, is emanating towards the user 440. The opaque legend area 1020 can be formed on either front or rear surface (i.e., respectively external or internal with respect to the window assembly) of the dust cover 414.

In a related embodiment, the dust cover 414 of the window assembly is complemented with and adjoined to a thin flexible plastic layer or film (for example, disposed onto at least one of the front and rear surfaces of the dust cover), which layer or film has a legend formed therein. In this configuration, the manufacture of the dust cover element does not require any modification, and only an addition of a patterned, icon-carrying layer is required. In an alternative configuration, the dust cover includes at least two substrates, optionally laminated to one another, each of which contains a portion of the specified indicia. In reference to FIG. 10A, for example, the dust cover 414 may contain two laminated plates 414a, 414b carrying, accordingly, the portions 1012a and 1012b of the indicia.

Figure 11A:
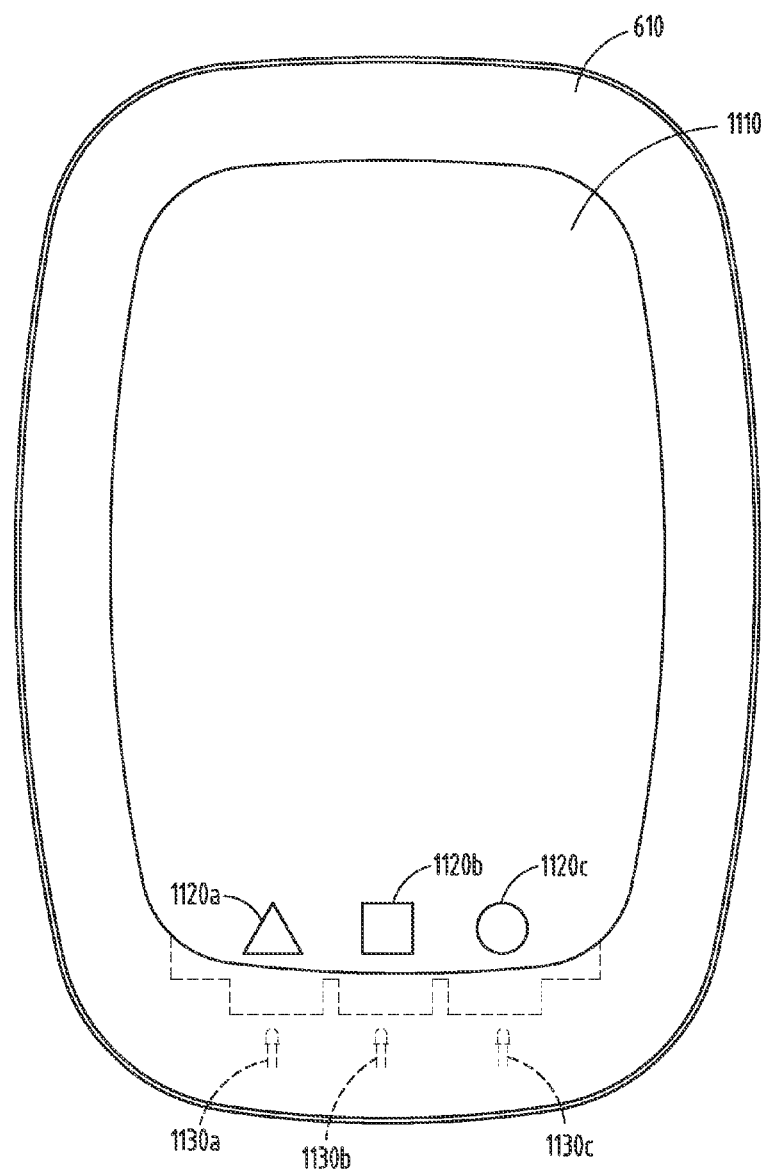
FIG. 11A is a partial front view of a window assembly illustrating an embodiment including a light guide.
Figure 11B:
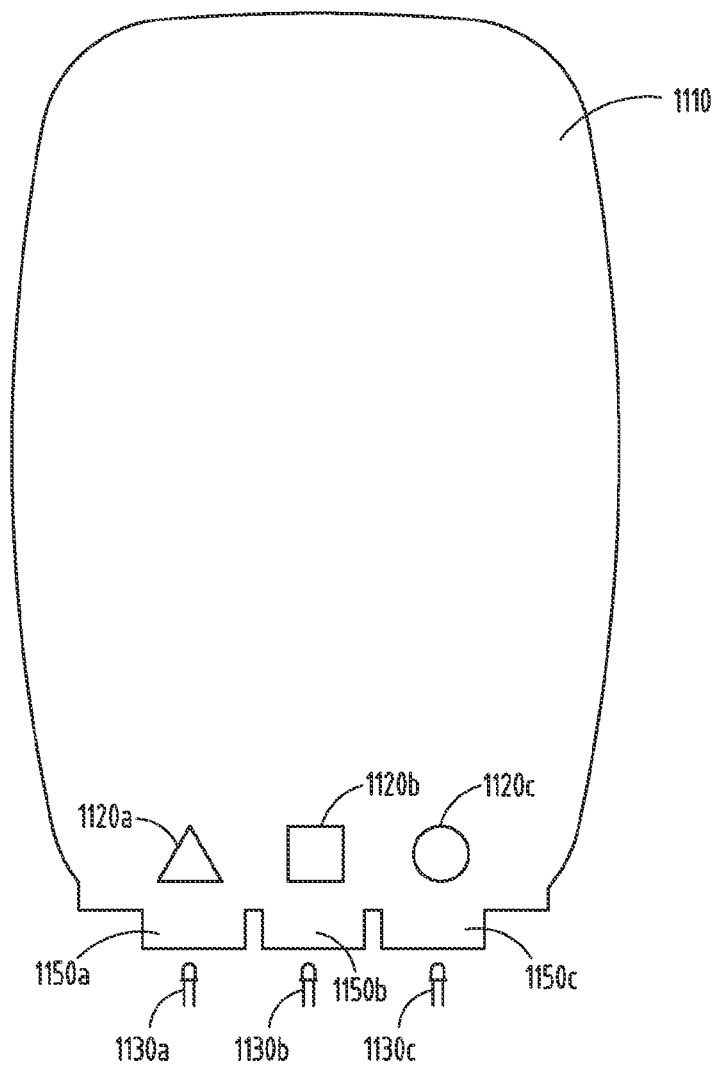
FIG. 11B is a partial front view of a dust cover used in the embodiment shown in FIG. 11A.

Referring again to FIGS. 10A, 10B and in further reference to FIGS. 11A, 11B, highlighting of the graphical or textual legend(s) described above is configured, for example, by edge-coupling (or, alternatively, butt-coupling) of light from a light source such as an LED, located outside of the clear aperture of the window in the housing structure of the window, into the dust cover plate 1110 (FIGS. 11A and 11B). In this case, the dust cover channels the light as a slab-waveguide, and the channeled light is outcoupled from the dust cover at the area of the legend due to frustration of the waveguiding conditions by the textured/patterned surface of the legend. In a specific embodiment, shown schematically in FIG. 11A, several legends 1120a, 1120b, 1120c and several light sources 1130a, 1130b, 1130c, respectively, are included that correspond to different actuators. Such actuators may be the optical or capacitive switches discussed above of the UI that is devoid of moveable parts. It may be preferred to ensure that no more than a single legend is highlighted when a given individual actuator is used.

Accordingly, the overall shape of the dust cover may be controlled to improve efficiency and uniformity of light delivery from a light source to the legend(s). For example, as shown in FIG. 11B, an embodiment of the dust cover 1110 is configured to include ridge-waveguides 1150a, 1150b, 1150c that channel light coupled into the dust cover 1110 towards corresponding legends 1120a, 1120b, 1120c. The ridge-waveguides may be formed by, for example, appropriate molding or heat-forming or surface machining of the rear and/or front surface of the dust cover 1110. In a related embodiment, the ridge waveguides are fabricated by affixing strips of optically-transparent material such as a film of plastic to the rear surface of the dust cover or via judiciously-patterned thin-film deposition. In the latter two cases, the waveguiding structure(s) associated with the dust cover is multilayered. Neither ridge waveguiding structure 1150a, 1150b, 1150c is limited to any particular shape, and can possess a cross-section that varies along the length of the waveguide in any pre-determined fashion. For example, the dust cover ridge waveguides may be tapered. It is appreciated that different light sources 1130a, 1130b, 1130c can generate light in different portions of visible spectrum. In a related embodiment, the dust cover 1110 is treated optically or thermally to change its optical properties internally to the dust cover, within judiciously defined limits, thereby creating lightguide(s) buried in the dust cover 1110. In an alternative implementation, the dust cover is configured to be of constant thickness across the clear aperture, and highlighting of the legend(s) is caused by light delivered to the legend(s) in a direction transverse to a surface of the dust cover with, for example, a free-space optical system and/or individual light pipes.

In yet another embodiment, the indicia or legend can be formed by projecting, from an external light source such as an LED (disposed either in front of or behind the dust cover) an optical image, including a graphical and/or textual depiction, onto the dust cover at an area designated as an input area and associated with at least one of the UI actuators of the window assembly. Under conditions of high level ambient irradiance (for example, during daylight hours), the projected image should be adapted to be discernible from the ambient light background. For example, an optical-image-based indicia projected onto an area within the bounds of the clear aperture of the dust cover should be visible (with optimized signal-to-noise ratio, SNR) on the background of light passing through the window from outside the aircraft. The SNR and, accordingly, the visibility of such indicia would benefit if, in one embodiment, the indicia image is projected from the front of the dust cover onto an optically-dense or opaque portion of the dust cover. A backlit LCD, digital light projector, or a laser source may be used for this purpose, forming either a continually-changing or static projected image-based indicia.

Yet another implementation may include positioning a back-lit or edge-lit LCD/OLED or other type of display behind or in front of the dust cover. The display may be attached using an adhesive, bonding via lamination with a portion of the dust cover, or simply mechanically held in place. In one embodiment, for example, the display includes a transparent OLED that is integrated with the dust cover and that, in operation, substantially preserves the light-transmitting characteristics of the window assembly (as compared with a backlit LED-based display, for example).

An autodimming window assembly containing a non-movable UI according to an embodiment of the present invention may optionally include an ambient light sensor and corresponding electronic circuitry configured to control a degree to which the EC element of the window assembly is dimmed or cleared even in the absence of the user input applied to the UI. Such ambient light sensor can be used to trigger a change in transmittance of the EC element of the assembly in response to change of exposure of the window assembly to sunlight and/or internal cabin light, for example. In an alternative implementation, the amount of light delivered to the indicia is controlled in response to the output from such ambient light sensor by accordingly modulating or changing the light output from the backlighting or edge-lighting light sources.

As an illustration, if an aircraft is in a holding pattern and circling around and waiting for permission to land, the same window assembly is periodically exposed to sunlight and is periodically in a shadow of the aircraft. Accordingly, the ambient light sensor may be built in the window housing structure or at another appropriate location within the window assembly in electronic communication with corresponding circuitry controlling the state of the EC element, and be configured to trigger the variation of voltage applied to the EC element thereby changing the transmission of the window assembly in response to sunlight exposure such as to maintain a predetermined throughput of light through the window into the aircraft cabin. In a specific example, to address the relatively long dimming and/or clearing time periods that an EC cell-based aircraft window typically has, a change in irradiance of ambient light incident onto the window from outside the aircraft can be anticipated with the use of additional sensors and, possibly, data input from the plane's navigation system.

Although the above description of embodiments is primarily directed to window control systems for aircraft, it should be appreciated that the embodiments, including those utilizing master and slave controller circuitry and algorithms, can be utilized to control the transmittance of windows in buildings and in other vehicles designed to carry passengers, such as, for example, ships, buses, trains, and automobiles. Various aspects of the embodiments disclosed herein may also apply to architectural windows.

Figure 13:
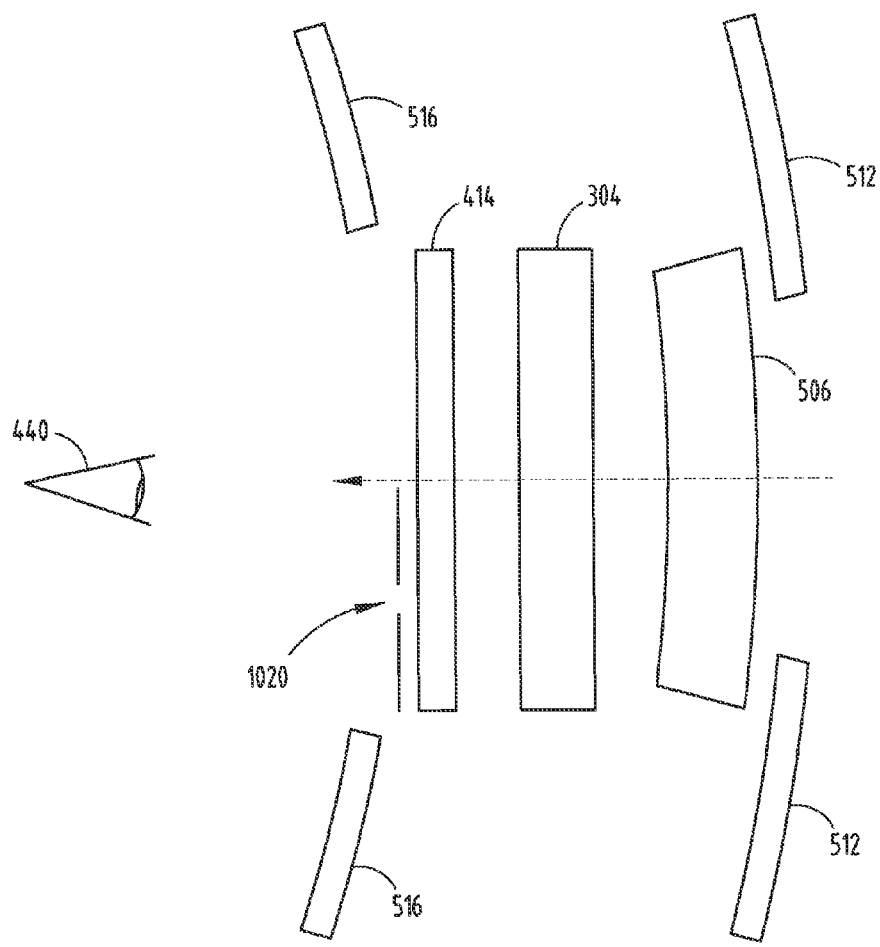
FIG. 13 is a diagram illustrating an input/indicia area positioned to reduce the level of background light.
Figure 14:
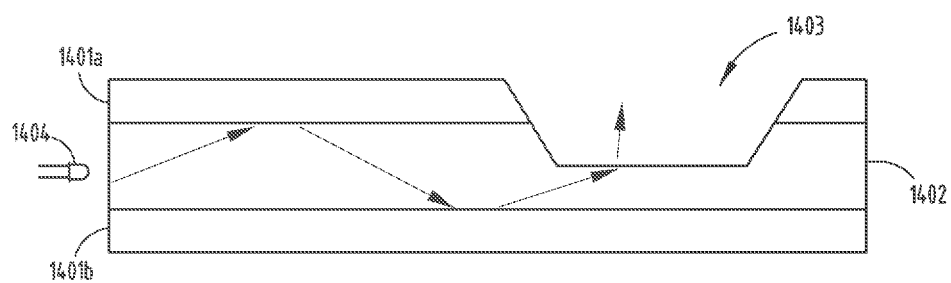
FIG. 14 is a simplified cross-sectional view of an embodiment of the window assembly.

Modifications of the invention will occur to those skilled in the art and to those who make or use the invention. For example, a particular area of the clear aperture of the dust cover in which the non-movable UI of the inventions is configured does not affect the operation of the device: it may be chosen to be in the top, bottom or any other portion of the window. However, judicious positioning of the input area(s) on the dust cover may facilitate the recognition and visual discerning of the indicia of the UI on the background of light streaming through the window into the aircraft. For example, defining the input area(s)/indicia in the lower portion of the clear aperture of the dust cover, which is typically below the eye-level of the viewer, results in the viewer looking at the indicia not against the externally-transmitted light but transversely to it. A similar situation is likely if an upper portion of the clear aperture of the dust cover is chosen for this purpose. The greater a distance between the inside (second) surface of the dust cover and the outside pressure pane, the more likely that, in the above geometry, the irradiance background provided by the external light for the indicia is reduced. A schematic illustration to this concept is provided by FIG. 13. The indicia area 1020 can be visible to the passenger from eye position 440. However, the line of sight over the top of the indicia can pass through the dust cover 414 and EC element 304, but not pass through the exterior pressure pane 506 and does not block the passenger's view through the window.

Moreover, at least the input area or, more generally, the whole first surface of the window assembly can be coated with a mechanically-hard coating when the first surface includes a polymer-based surface, to protect this surface against abrasive action of the user's finger(s) and to increase its durability. The front surface of the dust cover can include a hard coating (such as, for example, alumina or silica or a multilayer thin-film stack) adapted to increase resistance of the dust cover to wear and tear cause by interaction with the user's fingers. Such hard coating is of particular importance when the dust cover is adapted to operate as a light pipe channeling light from a light source towards the indicia at the dust cover, as discussed above. The density of such coating can be high to optimize the scratch resistance of the surface. Transparent coatings can be designed such as to reduce the reflectance of the first surface of the dust cover. If, on the other hand, the hard coating is optically dense (or even opaque), it can be applied to a smaller-than-a-whole portion of the dust cover and then laser-ablated or otherwise patterned to integrate the indicia into the hard coating. If a hard coating is electrically conductive, it can be used as part of a capacitive sensor (as a sensing pad that, in this case, is located on the first surface of the dust cover, for example). Such combined use would warrant patterning of an electrically conductive hard coating, that defines some area(s) of the hard coating that are electrically isolated from other areas of the hard coating.

An alternative method of forming input areas and/or indicia in association with the dust cover may include attaching a moveable button or moveable button module directly to the dust cover or, optionally, creating aperture(s)/opening(s) through the dust cover and integrating the module with such aperture(s)/opening(s). As an option, such button module may include a membrane switch or another incarnation of a mechanical switch. An advantage of such structural implementation over the related art is that the EC window, the dust cover, and the switch apparatus can be integrated into a single assembly prior to the installation of the assembly at the vehicle or aircraft.

It is appreciated that, in practical terms, the upgrade (or replacement) of a dust cover described in the present application may be required from time to time, as part of technical maintenance procedure, to ensure the continued operation of the autodimmable window assembly of the present invention. To this end, the dust cover and the housing of the assembly may be configured to be detachable from one another. In addition, a portion of the assembly may be configured to include an appropriate electrical connector(s) that align and electrically communicate with a corresponding interfacial portion(s) of the replaceable dust cover to effectuate complete electric circuitry once a new dust cover is installed.

Aircraft with or without a control management system (CMS) may be outfitted with any of the described embodiments, in each or at least some window aperture(s), and be further equipped with a local switch adapted to control the operation of all or at least more than one window assembly in a centralized fashion from the local switch. An embodiment of such local switch may include a UI including, for example, four actuators (referred to, for simplicity of illustration, as up/down/left/right actuators). With a local ad-hoc network, whether the CMS is present or not, the local switch may be adapted such that a user input, applied simultaneously for a predetermined duration of time to the specified two actuators such as the up and down actuators, for example, causes all window assemblies to enter the same state of transmission. Or, in a different example, the activation of a chosen actuator (such as, for example, the left actuator) causes the windows on the corresponding side of the aircraft (in this example, on the left side) to enter a predetermined state of transmission.

Edge lit icons can have crosstalk between individual icons. Lighting a single LED can cause its neighbor to also glow dimly. One embodiment is to only light a single icon at full brightness, but to dimly illuminate all other icons. This can mask any bleed-over from a full bright indicator to the neighboring off state indicators. Each LED may require a unique drive level to create a uniform appearance. For example, a neighbor to a full brightness LED may require very little power, and the icon 2 or 3 positions away may require a higher drive level, as very little light from the fully lit icon will reach it. Similarly, different colors may be driven into each icon, but neighboring indicators can have the LED color to be tuned to give the appearance desired because of crosstalk and mixing between neighbors. It may also be desirable to have multiple LEDs placed for each icon, and then drive the edge LEDs at different power levels than the center LEDs.

Another embodiment is based on a multilayer structure (FIGS. 14, 15, 16, and 17). Such a structure can support multiple independent icons and multiple simultaneous colors. With this method, light channeling or "fiber" layers (1402) and isolation or cladding layers (1401*a*, 1401*b*) are alternated to build the assembly. Areas in each fiber/isolation layer are disrupted (1403) to allow light to escape, creating the indicia which is specific to that layer. Illumination can be provided by light source 1404.

In order to create the isolation layer, a material with a lower index of refraction than that of the fiber layer can be used. For example, fiber layers may be made using polycarbonate, which has an index of refraction of approximately 1.58. If a material such as poly(methyl methacrylate) (PMMA) with a refractive index of 1.49 is used, total internal reflection may be achieved for light that enters the structure at appropriate angles.

While the total internal reflectance does not contain light that enters the structure at odd angles, it does help to reduce the crosstalk between indicators. Each of the methods disclosed here can be optimized by controlling the incoming light rays from the light source. This can be done by selecting lighting components with narrow emissions patterns, and by various other methods, such as, but not limited to use of mechanical apertures.

Light that enters the structure that does not meet the requirements for total internal reflection can escape quickly as it leaves the entry point. It is therefore advantageous to have the indicia and the light source separated. The high leakage area can be hidden behind the mounting structure for the dust cover.

Figure 15:
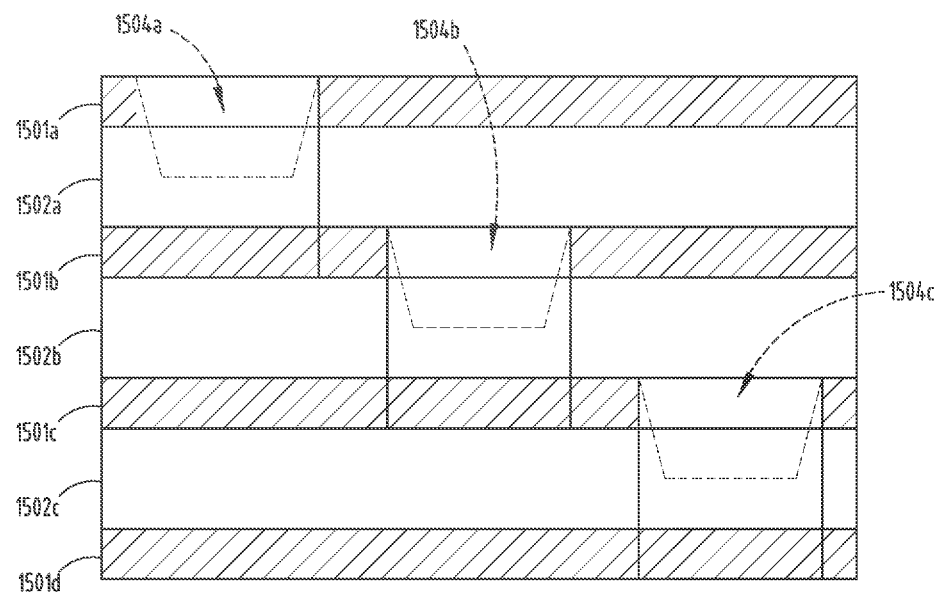
FIG. 15 is a simplified cross-sectional view of an embodiment of the window assembly.
Figure 16:
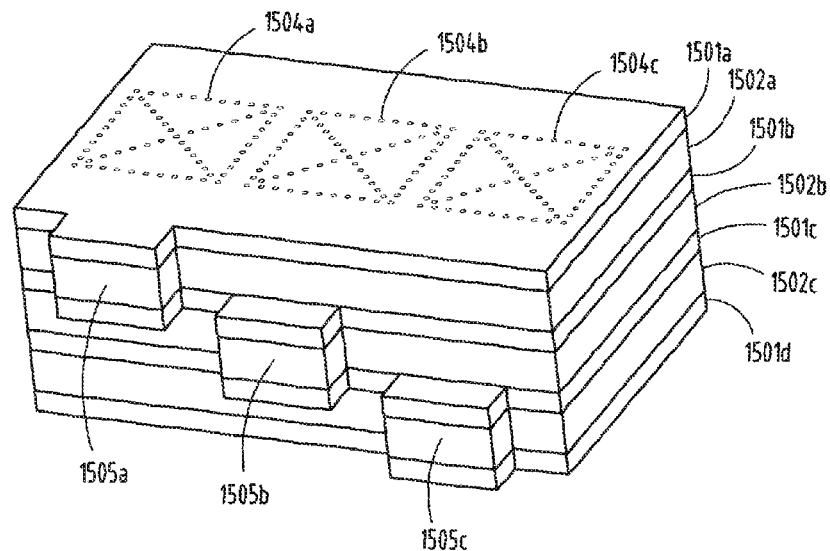
FIG. 16 is a simplified perspective, cross-sectional view of an embodiment of the window assembly.
Figure 17:
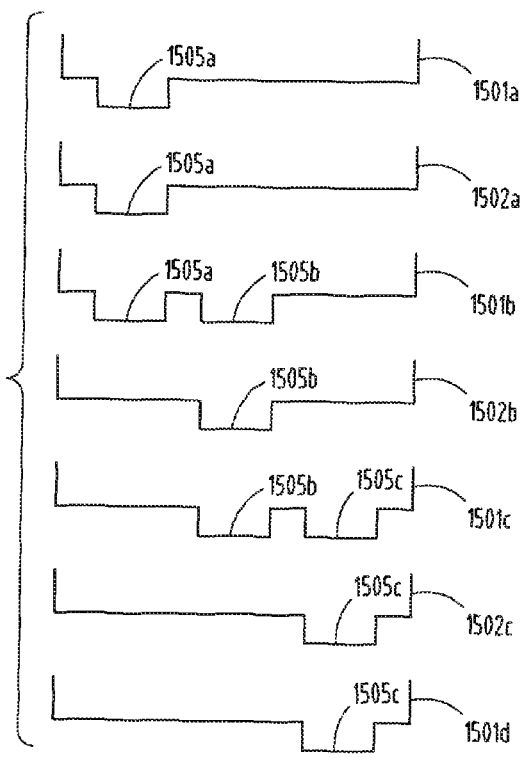
FIG. 17 is a diagram illustrating a shape of each layer of the window in FIG. 16.

In order to independently illuminate layers, tabs 1505*a*-1505*c* specific to each fiber layer are brought out of the edge of the assembly to allow each layer to be independently illuminated by a light source such as an LED. An exemplary cross section of such a structure is shown in FIG. 15. A perspective view is shown in FIG. 16, and the shape of each layer is shown in FIG. 17. The disrupted areas that create the indicia for fiber layers 1504*a*, 1504*b*, and 1504*c* are also shown in FIGS. 15 and 16. Examples of cladding are identified with reference characters 1501*a*, 1501*b*, 1501*c*, and 1501*d*. Examples of fiber layers are identified with reference characters 1502*a*, 1502*b*, and 1502*c*.

In order to create unique indicia in each layer, the pairs of cladding/fiber (or simply the fiber) may be individually disrupted (e.g., lasered or mechanically), and then the stack can be laminated into a single assembly. Alternatively, the stack may be assembled, and then a laser may be focused at a specific depth to disrupt a single fiber or fiber/cladding layer.

The described structure may also be further modified by adding a protective/hardened layer to the user side of the structure. It may also be optionally applied to the exterior side of the assembly. Materials such as GORILLA GLASS™ may be laminated to the assembly, or the assembly may be treated with a polymeric coating that may optionally have IR or UV blocking characteristics.

The structure may also be further modified by adding transparent electrodes to support a capacitive touch interface. These electrodes can be applied to an external layer, or be included in an inner layer as long as the coating is brought out to point that may be contacted. The capacitive touch pad may also optionally be used with a capacitive connection, where the capacitance of the user's finger is essentially connected to the sense circuitry via a series capacitance.

Figure 18A:
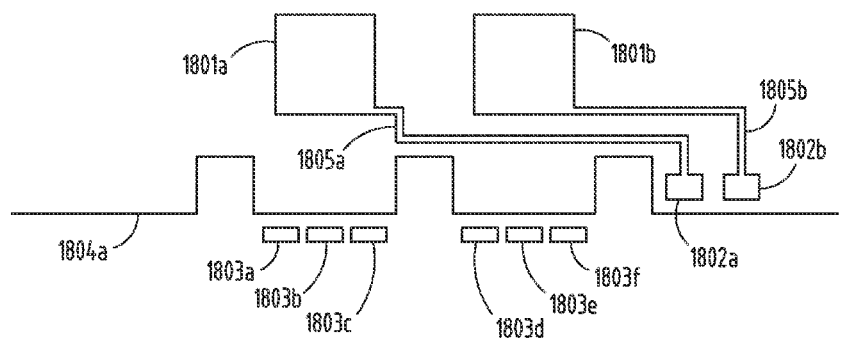
FIG. 18A is a partial front plan view of a lower portion of a dust cover including capacitive touch pads and a flexible circuit of a window assembly constructed according to another embodiment.
Figure 18B:
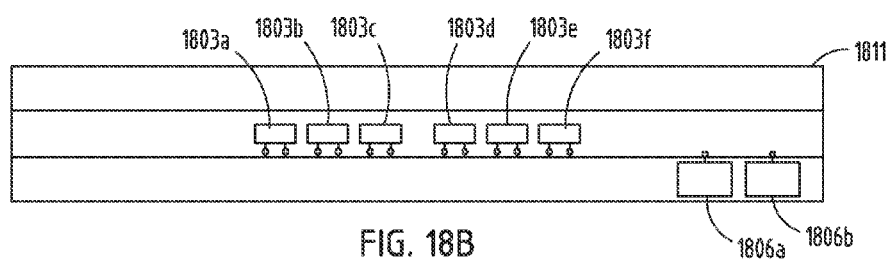
FIG. 18B is a front plan view of the flexible circuit used in the embodiment of FIG. 18A.
Figure 18C:
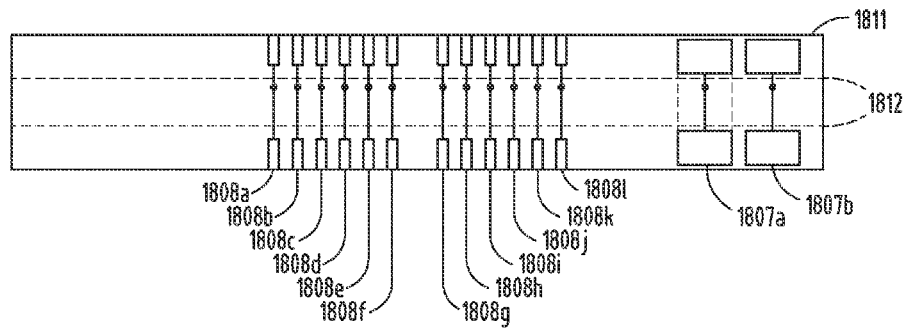
FIG. 18C is a rear plan view of the flexible circuit shown in FIG. 18B.
Figure 18D:
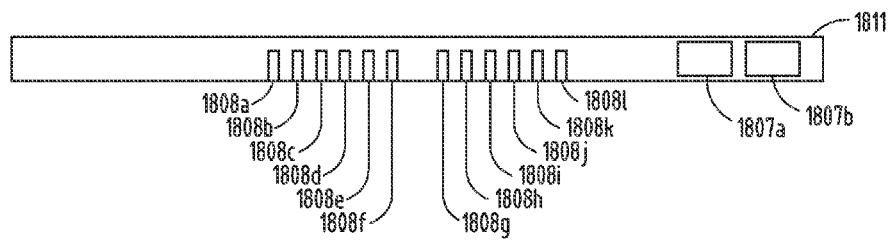
FIG. 18D is a side view of a part of the rear of the flexible circuit shown in FIG. 18C when folded for attachment to the edge of the dust cover shown in FIG. 18A.
Figure 18E:
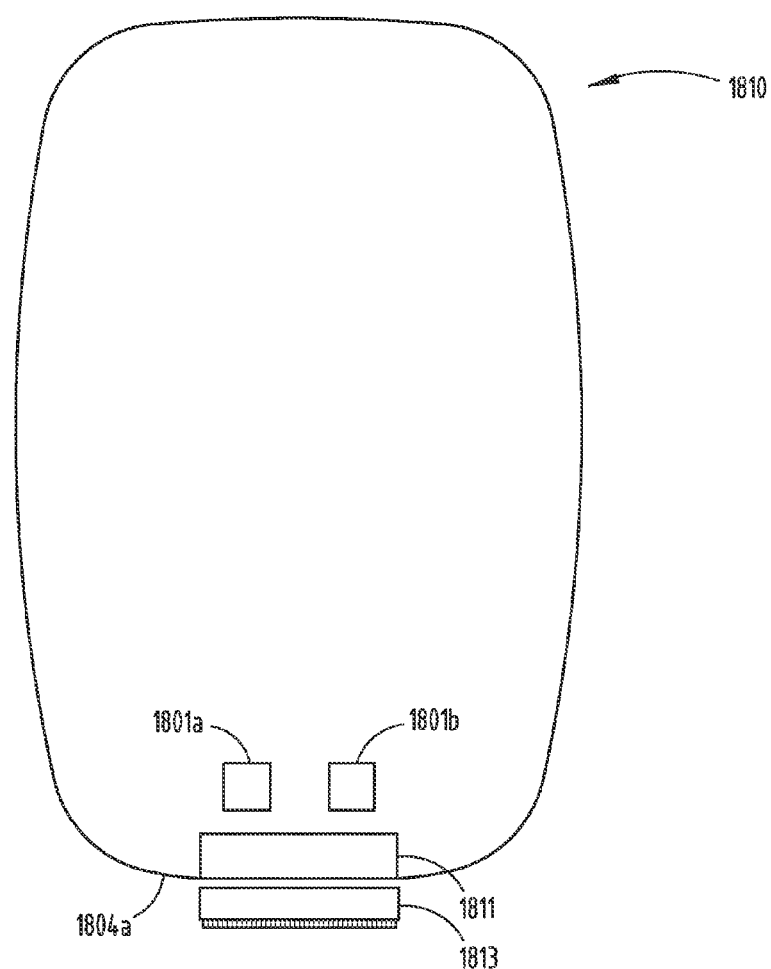
FIG. 18E is a partial front plan view of a lower portion of the dust cover shown in FIG. 18A but also including the flexible circuit shown in FIGS. 18B-18D.

In order to simplify installation in the aircraft, a flexible circuit with attached LEDs can be bonded to the edge of a dust cover that allows the window pane to be plugged into an edge card connector. FIG. 18A illustrates a side view of a window with transparent conductive capacitive touch pads 1801a and 1801b that are connected to pads 1802a and 1802b by traces 1805a and 1805b, respectively. LEDs are shown as 1803a-1803f. FIG. 18B illustrates the top side of a flexible circuit with the LEDs 1803a-1803f, and pads 1806a and 1806b that align with the pads on the window 1802a and 1802b. The bottom side of the flex circuit is shown in FIG. 18C with edge card pads 1807a and 1807b, as well as LED pads 1808a-18081. FIG. 18D illustrates the flex circuit after it has been folded along lines 1812 around the edge of the window pane 1804a. The flex circuit is then bonded to the window assembly, and conductive adhesive is used to connect pad 1802a to pad 1806a, and pad 1802b to pad 1806c. The entire window assembly 1810 containing the attached LED flex assembly 1811 is then plugged into edge card connector 1813, which is part of the window carrier assembly as shown in FIG. 18E. Additional circuitry such as the capacitive touch interface electronics may optionally be placed on the flex circuit.

Figure 19:
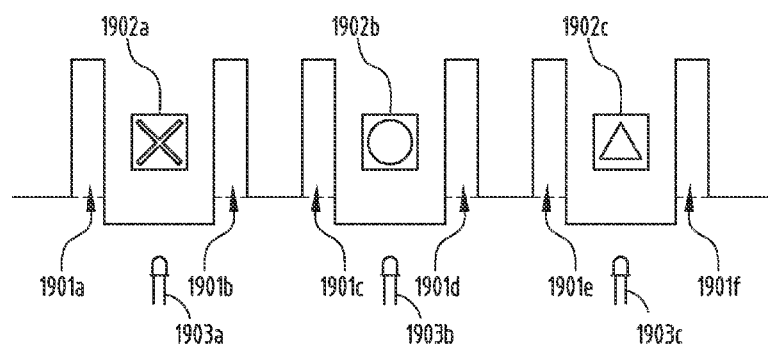
FIG. 19 is a partial front plan view of a bottom portion of a dust cover with isolation between indicia in accordance with another embodiment of the window assembly.

FIG. 19 depicts yet another method to improve isolation between indicia. In this case, indicia 1902a, 1902b, and 1902c are illuminated by light sources 1903a, 1903b, and 1903c. Wells of material with a lower index of refraction than the primary material are created (1901a-1901f). This creates total internal reflectance, which reduces light from one region to cross to a neighboring region. The base material would typically be machined to the correct shape, and would then be laminated between protective layers. The voids would then be filled with a transparent material with low index of refraction, such as, but not limited to, optical epoxy which is widely available through multiple sources with a variety of index options.

Figure 20:
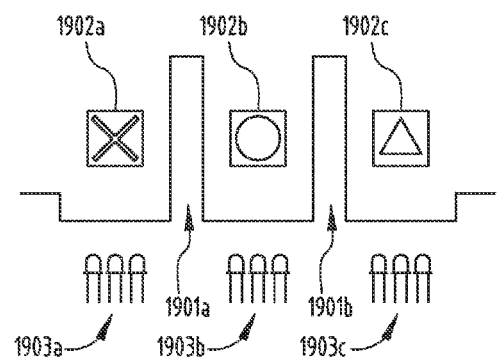
FIG. 20 is a simplified partial front plan view of a bottom portion of a dust cover with isolation between indicia in accordance with yet another embodiment of the window assembly.

FIG. 20 illustrates a similar approach where the icons are placed closer together. Multiple LEDs are shown as previously discussed.

Figure 21A:
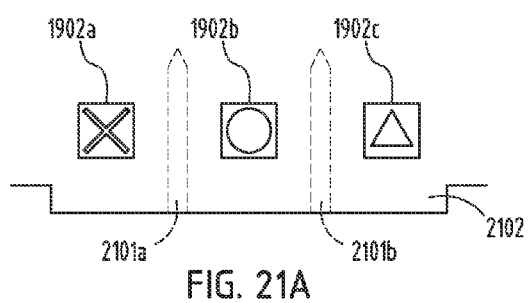
FIG. 21A is a partial front plan view of a bottom portion of a dust cover having holes in accordance with another embodiment of the window assembly.
Figure 21B:
FIG. 21B is a partial side view of the bottom portion of the dust cover shown in FIG. 21A.

If outer protective layers are not needed, a method shown in FIG. 21A may be used. Here, holes 2101a and 2101b are drilled into the side of the base material 2102, and then filled with optical epoxy. An edge view is shown in FIG. 21B. In this case, the holes 2101a and 2101b are created with the largest diameter possible with available manufacturing tolerances. There are small regions at each surface where the base material still allows crosstalk between icons, but the total light leakage between regions is still significantly reduced.

As these fill methods may be slightly visible to the user, the indicia may optionally be designed with a perimeter that approximates the shape of the disrupted area. The indicia will therefore mask the optical distortions that may occur. Icons with rectangular borders are good candidates for the methods described.

Figure 22:
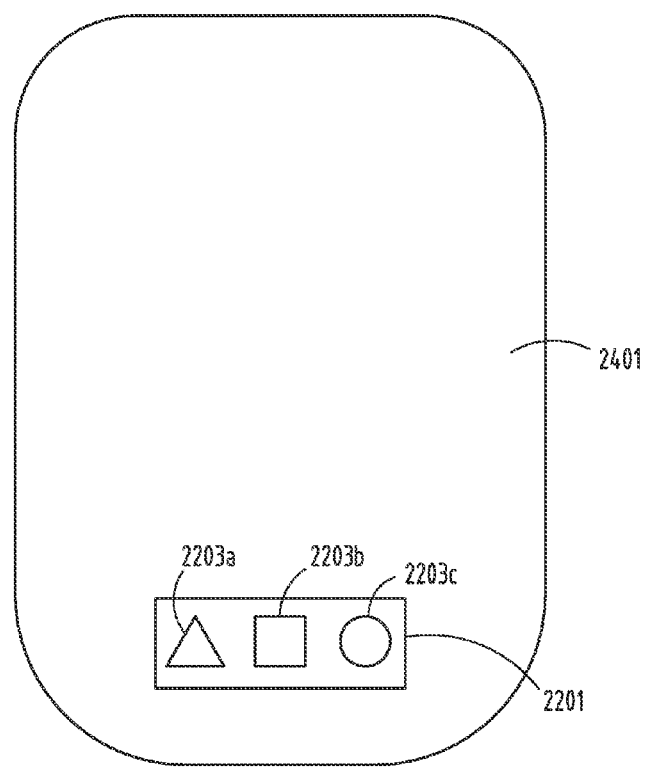
FIG. 22 is a front plan view of a dust cover having a display module in accordance with another embodiment.

In addition to having user interface buttons and indicia that appear to float in the window, it is possible to have a non-transparent button and display module 2201 that is still located in the dust cover 2401, but has no visible wires to connect it to the surrounding housing as shown in FIG. 22. The module 2201 may use a membrane, dome, capacitive touch pad, etc. technologies for buttons, and LEDs, LCDs, or static graphics for indicia 2203a-2203c. These buttons may be used to control the EC cell or other functions such as reading lamps on/off. In its simplest form, a single button may be used to rotate through a sequence of settings which may or may not be displayed in the module 2201.

Figure 23:
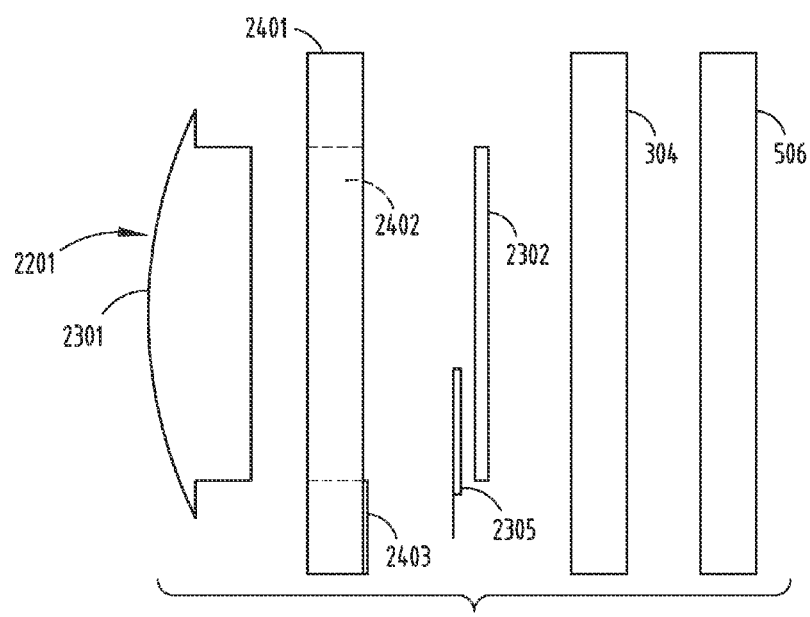
FIG. 23 is an exploded partial cross-sectional view of the dust cover and display module shown in FIG. 22.

The connection between the module 2201 and the master electronics is by either transparent conductor 2403 or very fine wire such that the connection method is not obvious to the user. A side view of such an assembly is shown in FIG. 23.

The module 2201 would typically be installed as a front 2301 and rear 2302 component forming an assembly that is placed through one or more holes 2402 in the dust cover 2401. A PCB is typically captured between the front and rear sections of the module 2201. Connections between the PCB and the transparent conductors 2403 on the rear of the dust cover 2401 are made by a metallic spring clip 2305 or elastomeric device.

Figure 24:
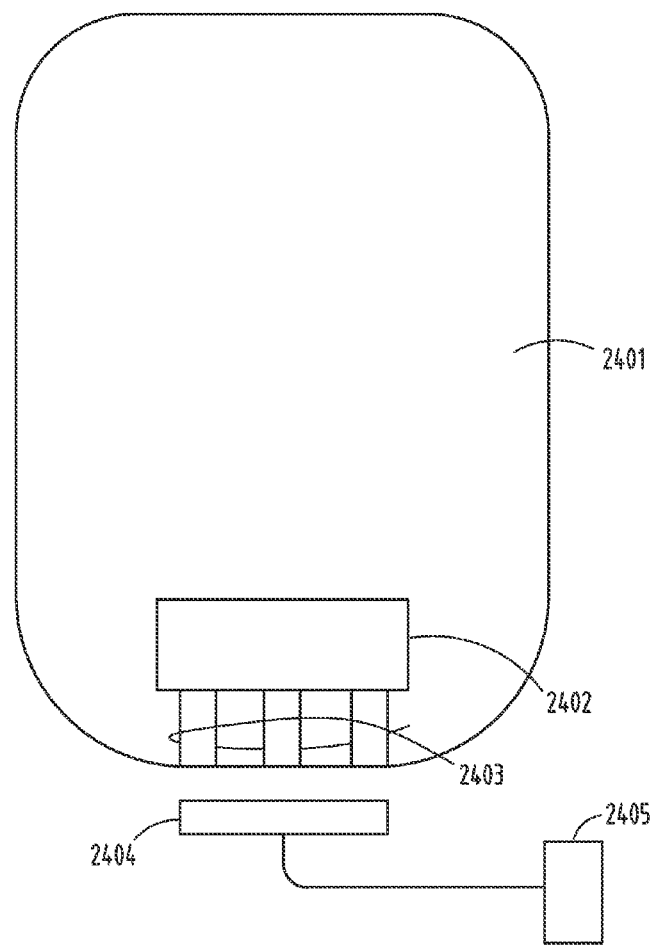
FIG. 24 is a rear plan view of the dust cover and display module shown in FIG. 22.

FIG. 24 shows a dust cover 2401 with a hole 2402 placed in it as described herein. Conductive traces 2403 are typically placed on the far side away from the passenger to avoid damage. An edge card connector 2404 is plugged into the edge of the dust cover to establish a connection between the transparent coatings and the control module 2405.

In an alternate embodiment, a module may be attached to the front or rear side of the dust cover via adhesive. Conductive adhesives may be used where needed to make connection to the transparent electrodes. The module may also be attached to the front of the dust cover, and be connected to the rear side conductive electrodes with vias filled with conductive material.

Because the airframe power supply voltage is relatively high compared with the typical voltage requirements of the user interface, a switching power supply can be used. A microprocessor might utilize 3.3 volts for supply, where the airframe might supply 28 volts. A button and indicator set might only draw 50 mA at 3.3 volts. By using a switching power supply, the 28-volt supply current is significantly reduced (only about 7 mA with an 85% efficient converter). With such low current requirements for the connection between the user interface and the control module, high series resistance (hundreds of ohms) can be tolerated.

ITO or similar coatings may be used on the side away from the user to make the connections between the control module and the user interface. This is to reduce damage to the coatings. In a typical application, two wide traces would be used to supply power, and 1 or more narrower traces would be used for data signals.

Various methods can be used to reduce the visibility of the coatings. Obviously, the thinner coatings will be less visible. Reducing the current requirements of the user interface module can help this. Widening the traces can also allow thinner coatings. The thickness of the coatings can also be decreased near the edge to avoid the visibility of any sharp transition. Furthermore, the placement of the user interface near the lower portion of the dust provides a backdrop of the inner frame assembly, which also helps to hide the coatings.

While a transparent coating can be used, it is also possible to use fine wire to make the connections. Here the traces can be small because of low currents. The wire gauge can be fine enough that it is almost invisible to the user. Wires can be adhesively attached to the rear surface of the dust cover or laminated inside of a multilayer structure.

As an additional enhancement, a photosensor may be added to the module 2201 facing toward the outside of the vehicle. This sensor can be used to measure the amount of light entering the cabin through the EC cell. An additional sensor may be placed in the module facing into the cabin to measure interior light levels. One or more of these sensors may be used to automatically control the darkness of the EC cell as previously described.

It will be appreciated that embodiments of the invention described herein may be comprised of one or more conventional processors and unique stored program instructions that control one or more processors to implement, in conjunction with certain non-processor circuits, some, most, or all of the functions of a switchable dimming window system, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions or in one or more application-specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

Therefore, it is understood that the embodiments shown in the drawings and described above are merely for illustrative purposes and are intended to be included within, but not intended to limit the scope of the invention.

What is claimed is:

1. A substantially optically transparent cover for a variable transmittance window assembly, the cover comprising:
   a first optically transparent substrate serving as said cover for the variable transmittance window assembly and having an area of at least $0.1 \text{ m}^2$; and
   a user interface (UI) on a surface of said first optically transparent substrate and devoid of moveable elements, the UI including visually perceivable indicia representing an operational parameter of said variable transmittance window assembly, wherein the UI is transparent with the exception of the visually perceivable indicia,
   wherein the variable transmittance window assembly comprises an electro-optic device comprising:
      a first transparent member,
      a second transparent member spaced from the first transparent member,
      a seal disposed between the first and second members about the perimeter thereof to thereby form a chamber, and
      an electro-optic medium disposed within the chamber,
   wherein said first optically transparent substrate of the cover is configured to be mounted spaced apart from, and not in direct contact with, the electro-optic device.

2. A cover according to claim 1, further comprising a material layer on a surface of said first optically transparent substrate that is adapted to increase at least one of optical density, electrical conductivity, and resistance to mechanical abrasion of said UI.

3. A cover according to claim 1, further comprising electrically-conductive pads on a surface of said first optically transparent substrate, said pads being electrically separated from one another.

4. A cover according to claim 1, wherein the indicia includes a surface, of said first optically transparent substrate, adapted to scatter light incident thereupon.

5. A cover according to claim 4, wherein the surface adapted to scatter light incident thereupon includes a trough containing a fluorescent material.

6. A cover according to claim 1, wherein the first optically transparent substrate has a spatially non-uniform thickness.

7. A cover according to claim 1, wherein the first optically transparent substrate includes a ridge lightguide.

8. A cover according to claim 1, further comprising a layer adapted as a lightguide, the layer affixed to a surface of said first optically transparent substrate.

9. A cover according to claim 1, further comprising a second optically transparent substrate adjoining the first optically transparent substrate.

10. A cover according to claim 1, wherein the first and second optically transparent substrates are laminated to one another.

11. A cover according to claim 1, wherein the UI comprises a transparent display for displaying the visually perceivable indicia.

12. A cover according to claim 1, wherein the UI comprises a transparent electrically conductive pads for capacitive touch input.

13. A cover according to claim 12, wherein the transparent electrically conductive pads are provided on a surface of the first optically transparent substrate that faces the electro-optic device.

14. A variable transmittance window assembly comprising:
   a housing structure defining an opening therethrough;
   an electro-optic device having a clear aperture of at least $0.1 \text{ m}^2$ secured inside said opening;
   an optically transparent dust cover affixedly disposed in said opening in a spaced-apart relationship to said electro-optic device;
   a user interface (UI) articulated to a surface of said dust cover, the UI including visually perceivable indicia representing an operational parameter of said variable transmittance window assembly; and
   a light source in optical communication with an edge of said dust cover, wherein the dust cover is configured as a lightguide adapted to deliver light from said light source to the UI,
   wherein the electro-optic device comprises:
      a first transparent member,
      a second transparent member spaced from the first transparent member,
      a seal disposed between the first and second members about the perimeter thereof to thereby form a chamber, and
      an electro-optic medium disposed within the chamber,
   wherein said optically transparent dust cover is not in direct contact with the electro-optic device.

15. An assembly according to claim 14, wherein the visual perceivable indicia includes a surface of the dust cover adapted to scatter light incident thereupon.

16. An assembly according to claim 15, wherein the surface adapted to scatter light incident thereupon includes a trough containing a fluorescent material.

17. An assembly according to claim 14, further comprising a pressure pane having first and second surfaces and disposed in said housing structure and separated from the dust cover by said electro-optic cell facing the first surface of the pressure pane, the pressure pane configured to protect said electro-optic cell from barometric pressure applied to the second surface of the pressure pane.

18. An assembly according to claim 14, further comprising a material layer on a surface of said dust cover that is adapted to increase at least one of optical density, electrical conductivity, and resistance to mechanical abrasion of said UI.

19. An assembly according to claim 14, wherein the UI comprises a transparent display for displaying the visually perceivable indicia, wherein the transparent display is illuminated by the light source through the edge-lit dust cover.

20. A substantially optically transparent cover for a variable transmittance window assembly, the cover comprising:
- a first optically transparent substrate serving as said cover for the variable transmittance window assembly and having an area of at least 0.1 m$^2$; and
- a user interface (UI) on a surface of said first optically transparent substrate and devoid of moveable elements, the UI including a transparent display for displaying visually perceivable indicia representing an operational parameter of said variable transmittance window assembly, wherein the UI comprises transparent electrically conductive pads for capacitive touch input,
- wherein the variable transmittance window assembly comprises an electro-optic device comprising:
  - a first transparent member,
  - a second transparent member spaced from the first transparent member,
  - a seal disposed between the first and second members about the perimeter thereof to thereby form a chamber, and
  - an electro-optic medium disposed within the chamber.

* * * * *